United States Patent
Cheung et al.

(10) Patent No.: US 7,411,758 B1
(45) Date of Patent: Aug. 12, 2008

(54) DISK DRIVE SERVO CONTROL USING SPIRALS

(75) Inventors: Man Cheung, Campbell, CA (US); Perry Neos, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 63 days.

(21) Appl. No.: 11/337,360

(22) Filed: Jan. 23, 2006

(51) Int. Cl.
*G11B 21/02* (2006.01)

(52) U.S. Cl. .................. 360/75; 360/51; 360/77.07

(58) Field of Classification Search .............. None
See application file for complete search history.

(56) References Cited

U.S. PATENT DOCUMENTS

| | | | |
|---|---|---|---|
| 6,967,799 B1* | 11/2005 | Lee | 360/51 |
| 6,985,316 B1* | 1/2006 | Liikanen et al. | 360/29 |
| 6,989,954 B1* | 1/2006 | Lee et al. | 360/75 |
| 7,068,459 B1* | 6/2006 | Cloke et al. | 360/75 |

* cited by examiner

*Primary Examiner*—K. Wong

(57) ABSTRACT

A servo control system includes a peak detection module that detects peak times of spiral signals generated by reading spirals prewritten on a magnetic medium. The servo control system includes a control module that determines positions of the spirals based on the peak times, stores the positions of the spirals, seeks and tracks the spirals using the positions, and writes servo on the magnetic medium based on the positions of the spirals.

56 Claims, 22 Drawing Sheets

Raw Spiral Peak Time

Vertical axis: clock counts
Horizontal axis: samples

Vertical axis: clock counts
Horizontal axis: samples

Vertical axis: clock counts
Horizontal axis: samples

DISK DRIVE SERVO CONTROL USING SPIRALS

FIELD OF THE INVENTION

The present invention relates to computer disk drives, and more particularly to disk drive servo control systems using spirals.

BACKGROUND OF THE INVENTION

Host devices such as computers, laptops, personal video recorders (PVRs), MP3 players, game consoles, servers, set-top boxes, digital cameras, and/or other electronic devices often need to store a large amount of data. Storage devices such as hard disk drives (HDD) may be used to meet these storage requirements.

Referring now to FIG. 1, an exemplary hard disk drive (HDD) 10 is shown to include a hard disk drive (HDD) system 12 and a hard drive assembly (HDA) 13. The HDA 13 includes a magnetic medium or one or more platters 14. The platters 14 are coated with magnetic layers 15. The magnetic layers 15 store positive and negative magnetic fields that represent binary 1's and 0's. A spindle motor, shown schematically at 16, rotates the hard drive platters 14. Generally, the spindle motor 16 rotates the hard drive platters 14 at a fixed speed during read/write operations. One or more read/write actuator arms 18 moves relative to the hard drive platters 14 to read and/or write data to/from the hard drive platters 14.

A read/write device 20 is located near a distal end of the read/write arm 18. The read/write device 20 includes a write element such as an inductor that generates a magnetic field. The read/write device 20 also includes a read element (such as a magneto-resistive (MR) element) that senses the magnetic field on the platter 14. A preamp circuit 22 amplifies analog read/write signals.

When reading data, the preamp circuit 22 amplifies low level signals from the read element and outputs the amplified signal to a read/write channel device 24. When writing data, a write current is generated which flows through the write element of the read/write device 20. The write current is switched to produce a magnetic field having a positive or negative polarity. The positive or negative polarity is stored by the hard drive platter 14 and is used to represent data.

The HDD 12 typically includes a buffer 32 that stores data that is associated with the control of the hard disk drive and/or buffers data to allow data to be collected and transmitted as larger data blocks to improve efficiency. The buffer 32 may employ DRAM, SDRAM or other types of low latency memory. The HDD 12 further includes a processor 34 that performs processing that is related to the operation of the HDD 10.

The HDD 12 further includes a hard disk controller (HDC) 36 that communicates with a host device via an input/output (I/O) interface 38. The I/O interface 38 can be a serial or parallel interface, such as an Integrated Drive Electronics (IDE), Advanced Technology Attachment (ATA), or serial ATA (SATA) interface. The I/O interface 38 communicates with an I/O interface 44 that is associated with a host device 46.

The HDC 36 also communicates with a spindle/voice coil motor (VCM) driver 40 and/or the read/write channel device 24. The spindle/VCM driver 40 controls the spindle motor 16 that rotates the platters 14. The spindle/VCM driver 40 also generates control signals that position the read/write arm 18, for example using a voice coil actuator, a stepper motor or any other suitable actuator.

Referring now to FIG. 2, data is typically written on the platters 14 in concentric circles called tracks 50. The tracks 50 are divided radially into multiple sectors 52. As the diameter of the tracks 50 decreases toward the center of the platter 14, the sector size decreases. Before performing a read or a write operation on a sector of a track, a head locks onto the track by referring to positioning information called servo that is generally prewritten on the platters. The servo provides the positioning information so that the heads know where to write data on the platters 14 during a write operation and where to read data from during a read operation.

Traditionally, the servo is prewritten in multiple sectors using a special servo writing apparatus when a disk drive is manufactured. The traditional servo writing methods, however, become impractical as the track density increases for a disk drive. More recently, track density has increased as the demand for storage capacity and spin rates of disk drives are increasing. Additionally, the diameter of disk platters is shrinking so that the drives can fit into smaller devices such as palmtops and other handheld devices that require disk drives that are small in physical size and high in storage capacity.

The increasing track density also makes traditional servo writing physically impractical. Accordingly, modern disk drives increasingly use self-servo-write (SSW) methods to write their own servo sectors using the same read/write heads that are used to read/write regular data. When writing the servo using the SSW methods, the heads typically lock onto reference servo sectors (RSS) that are prewritten on the platters in the form of spirals.

The spirals, however, are sometimes written imperfectly. Moreover, when reading the spirals, the spindle speed may fluctuate slightly. Additionally, the actuator arm may not be perfectly steady when positioned onto an RSS. Consequently, a head may not be able to quickly and accurately lock onto an RSS as the head moves across a platter.

SUMMARY OF THE INVENTION

A servo control system comprises a peak detection module that detects peak times of spiral signals generated by reading spirals prewritten on a magnetic medium. The servo control system comprises a control module that determines positions of the spirals based on the peak times, stores the positions of the spirals, seeks and tracks the spirals using the positions, and writes servo on the magnetic medium based on the positions of the spirals.

In another feature, the control module measures an actual time from one of a reference servo mark and a peak of one of the spiral signals to a peak of an adjacent spiral signal. The control module calculates an expected time from one of a reference servo mark and a peak of one of the spiral signals to a peak an adjacent spiral signal. The control module generates a difference between an actual time and an expected time from one of a reference servo mark and a peak of one of the spiral signals to a peak of an adjacent spiral signal. The control module generates N number of the differences, where N is an integer greater than 1, and uses an average of the N differences as a correction value to determine a position of one of the spirals.

In other features, the control module seeks one of the spirals by changing an expected time by a seek-step time for the spiral and by translating the resulting time into a distance to seek the spiral. The control module tracks the spirals by inferring distance from time.

In still other features, a timing window generator generates a timing window to scan the spiral signals. A phase-locked loop (PLL) module generates a control signal to synchronize the spiral signals to a timing window generated by a timing window generator.

In another feature, the peak detection module determines a peak time of one of the spiral signals relative to a reference servo mark. The peak detection module divides the timing window into multiple sub-windows and calculates integral values of amplitudes of one of the spiral signals in each of the sub-windows. The peak detection module determines a half-integral point of the integral values and detects one of the sub-windows that corresponds to the half-integral point. The peak detection module counts time from one of the sub-windows to the reference servo mark to determine the peak time.

In other features, a phase error detection module detects a phase error between time stamps of a plurality of reference servo marks and minimizes the phase error. The phase error detection module selects a first time stamp that differs from a second time stamp by a time that is substantially equal to a predetermined time. The phase error detection module calculates a raw timing error by comparing the first time stamp with an expected time stamp. The phase error detection module calculates a modulus of the raw timing error and generates a phase error signal. The phase-locked loop (PLL) module uses the phase error signal generated by the phase error detection module to synchronize a self-servo write (SSW) clock to a reference servo sector (RSS) clock derived from the spiral signals.

In another feature, the control module comprises at least one of the peak detection module, a timing window generator module, a phase-locked loop module, and a phase error detection module.

In still other features, a hard disk subsystem comprising the servo control system further comprises a hard disk controller that communicates with the servo control system, a read-write channel that communicates with the hard disk controller, and an interface that communicates with the hard disk controller.

In another feature, a hard disk system comprising the hard disk subsystem further comprises a magnetic medium and a read-write head that communicates with the hard disk subsystem and that reads and writes data on the magnetic medium.

In still other features, a servo control system comprises peak detection means for detecting peak times of spiral signals generated by reading spirals prewritten on a magnetic medium, and control means for determining positions of the spirals based on the peak times, storing the positions of the spirals, seeking and tracking the spirals using the positions, and writing servo on the magnetic medium based on the positions of the spirals.

In other features, the control means measures an actual time from one of a reference servo mark and a peak of one of the spiral signals to a peak of an adjacent spiral signal. The control means calculates an expected time from one of a reference servo mark and a peak of one of the spiral signals to a peak an adjacent spiral signal. The control means generates a difference between an actual time and an expected time from one of a reference servo mark and a peak of one of the spiral signals to a peak of an adjacent spiral signal. The control means generates N number of the differences, where N is an integer greater than 1, and uses an average of the N differences as a correction value to determine a position of one of the spirals.

In still other features, the control means seeks one of the spirals by changing an expected time by a seek-step time for the spiral and by translating a resulting time into a distance to seek the spiral. The control means tracks the spirals by inferring distance from time.

In other features, the servo control system comprises timing window generator means for generating a timing window to scan the spiral signals. The servo control system further comprises phase-locked loop (PLL) means for generating a control signal to synchronize the spiral signals to a timing window generated by timing window generator means.

In another feature, the peak detection means determines a peak time of one of the spiral signals relative to a reference servo mark. The peak detection means divides the timing window into multiple sub-windows and calculates integral values of amplitudes of one of the spiral signals in each of the sub-windows. The peak detection means determines a half-integral point of the integral values and detects one of the sub-windows that corresponds to the half-integral point. The peak detection means counts time from the one of the sub-windows to the reference servo mark to determine the peak time.

In other features, the servo control system further comprises phase error detection means for detecting a phase error between time stamps of a plurality of reference servo marks and minimizing the phase error. The phase error detection means selects a first time stamp that differs from a second time stamp by a time that is substantially equal to a predetermined time. The phase error detection means calculates a raw timing error by comparing the first time stamp with an expected time stamp. The phase error detection means calculates a modulus of the raw timing error and generates a phase error signal. The phase-locked loop (PLL) means uses the phase error signal generated by the phase error detection means to synchronize a self-servo write (SSW) clock to a reference servo sector (RSS) clock derived from the spiral signals.

In another feature, the control means comprises at least one of the peak detection means, timing window generator means, phase-locked loop means, and phase error detection means.

In still other features, a hard disk subsystem comprising the servo control system further comprises hard disk controller means for communicating with the servo control system, read-write channel means for communicating with the hard disk controller means, and interface means for communicating with the hard disk controller means.

In another feature, a hard disk system comprising the hard disk subsystem further comprises a magnetic medium, and read-write head means for communicating with the hard disk subsystem for reading and writing data on the magnetic medium.

In still other features, a computer program stored on a computer-readable medium and executed by a processor for disk drive servo control comprises detecting peak times of spiral signals generated by reading spirals prewritten on a magnetic medium, determining positions of the spirals based on the peak times, storing the positions of the spirals, seeking and tracking the spirals using the positions, and writing servo on the magnetic medium based on the positions of the spirals.

In another feature, the computer program further comprises measuring an actual time from one of a reference servo mark and a peak of one of the spiral signals to a peak of an adjacent spiral signal. The computer program further comprises calculating an expected time from one of a reference servo mark and a peak of one of the spiral signals to a peak an adjacent spiral signal. The computer program further comprises generating a difference between an actual time and an expected time from one of a reference servo mark and a peak of one of the spiral signals to a peak of an adjacent spiral signal. The computer programs further comprises generating N number of differences, where N is an integer greater than 1, and using an average of the N differences as a correction value to determine a position of one of the spirals.

In other features, the computer program further comprises seeking one of the spirals by changing an expected time by a seek-step time for the spiral and by translating a resulting time into a distance to seek the spiral. The computer program further comprises tracking the spirals by inferring distance from time.

In still other features, the computer program further comprises generating a timing window to scan the spiral signals. The computer program further comprises generating a control signal to synchronize the spiral signals to a timing window generated by a timing window generator.

In another feature, the computer program further comprises determining a peak time of one of the spiral signals relative to a reference servo mark. The computer program further comprises generating a timing window, dividing the timing window into multiple sub-windows, and calculating integral values of amplitudes of one of the spiral signals in each of the sub-windows. The computer program further comprises determining a half-integral point of the integral values and detecting one of the sub-windows that corresponds to the half-integral point. The computer program further comprises counting time from the one of the sub-windows to the reference servo mark to determine the peak time.

In another feature, the computer program further comprises detecting a phase error between time stamps of a plurality of reference servo marks and minimizing the phase error. The computer program further comprises selecting a first time stamp that differs from a second time stamp by a time that is substantially equal to a predetermined time. The computer program further comprises calculating a raw timing error by comparing the first time stamp with an expected time stamp. The computer program further comprises calculating a modulus of the raw timing error and generating a phase error signal. The computer program further comprises using the phase error signal to synchronize a self-servo write (SSW) clock to a reference servo sector (RSS) clock derived from the spiral signals.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
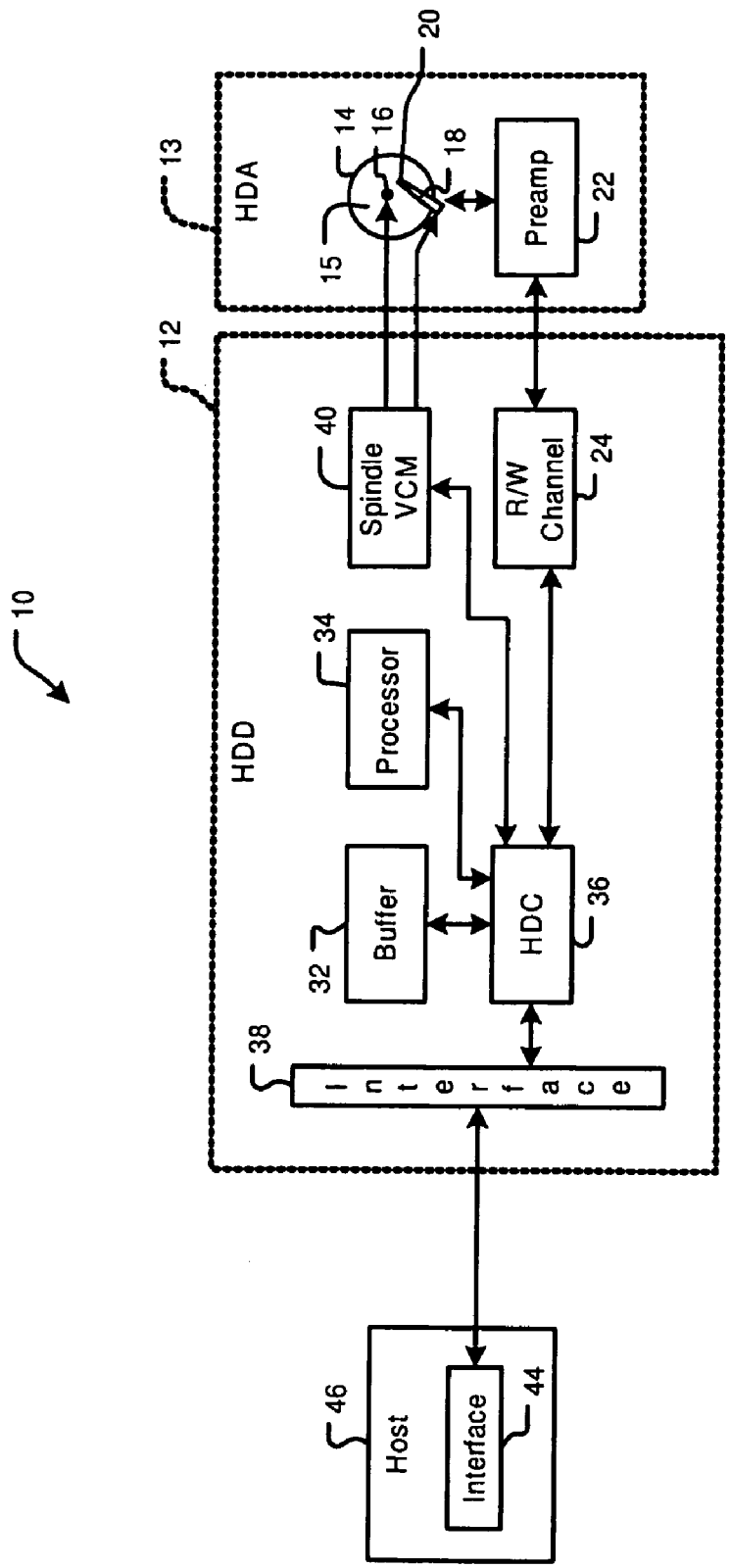
FIG. 1 is an exemplary functional block diagram of a disk drive according to the prior art.
Figure 2:
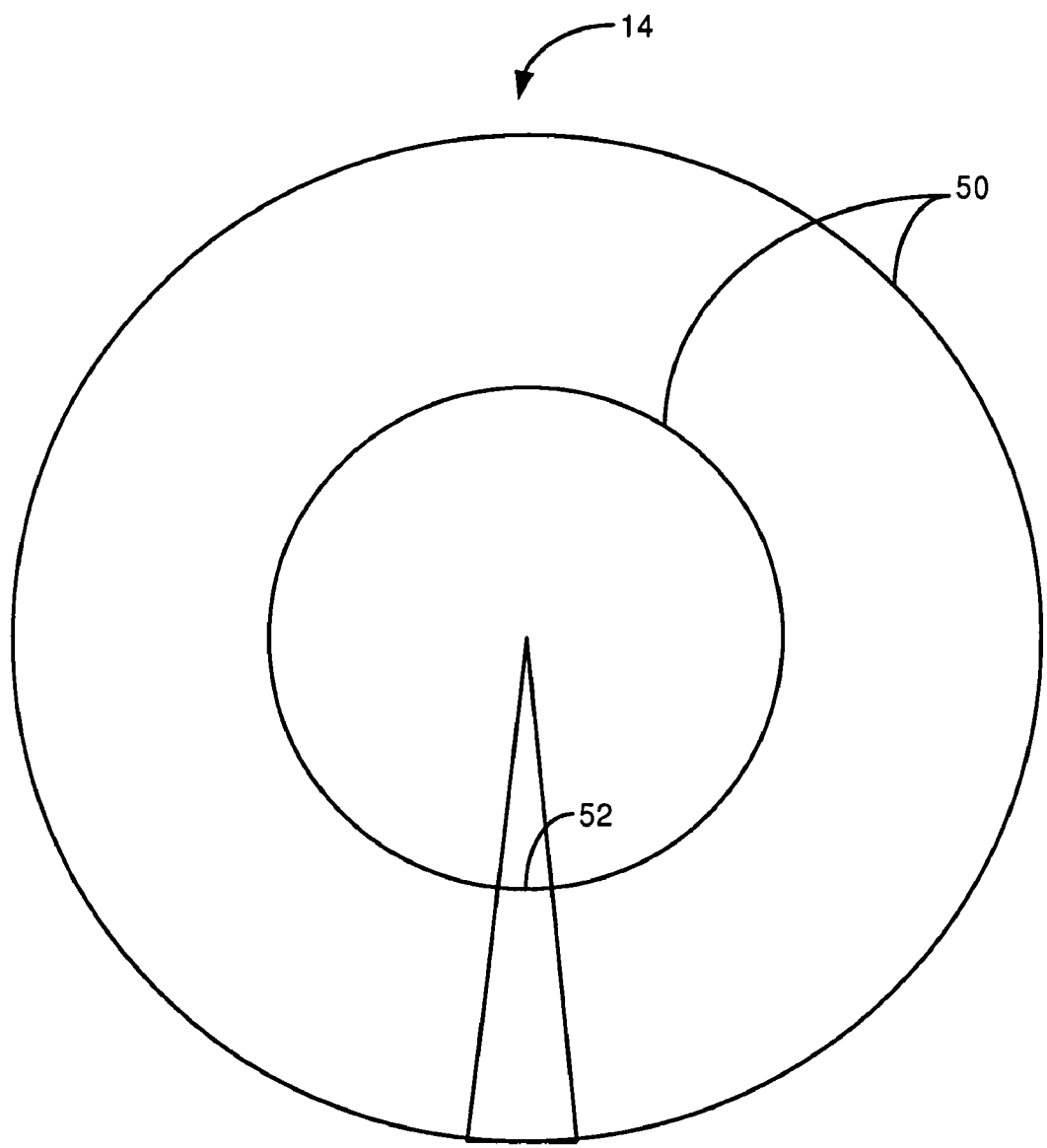
FIG. 2 is an exemplary illustration of tracks and sectors in a disk drive according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 3:
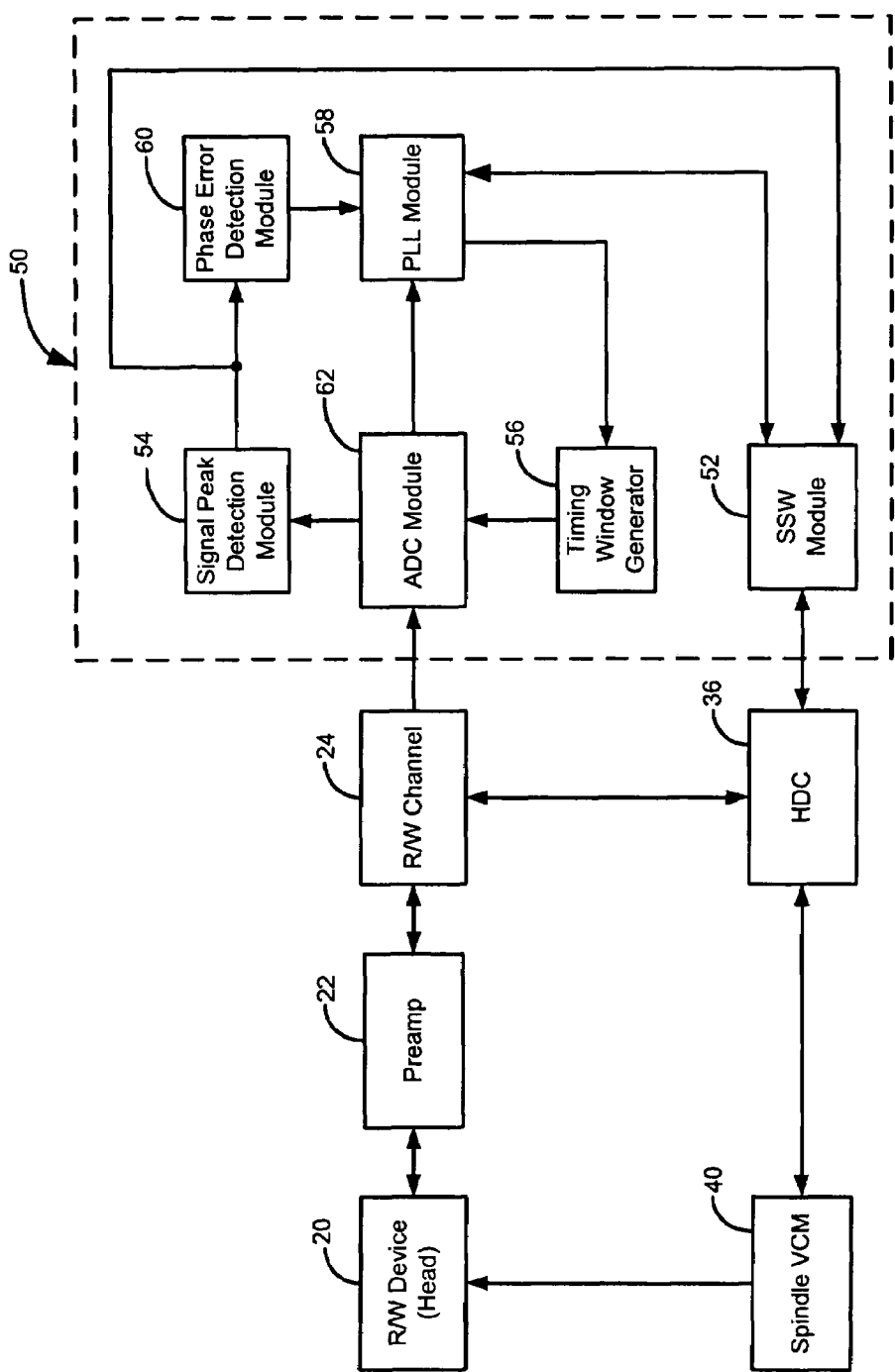
FIG. 3 is a functional block diagram of an exemplary system for servo control in disk drives according to the present invention.

Referring now to FIG. 3, a system 50 for disk drive servo control using spirals is shown. The system 50 performs spiral calibration. The system 50 maps or learns the position of each spiral and then uses that information as a reference to track and seek spirals. The system 50 comprises an analog-to-digital converter (ADC) module 62, a signal peak detection module 54, a phase error detection module 60, a phase-locked loop (PLL) module 58, a timing window generator 56, and an SSW module 52.

Initially, a hard disk controller (HDC) 36 issues a spin up command to a spindle/VCM driver 40. The spindle/VCM driver 40 starts a spindle motor 16 and spins up a spindle comprising one or more platters 14 to a predetermined speed. Then the HDC 36 issues a head load command to the spindle/VCM driver 40 that moves an arm 18. A read/write device (head) 20 is mounted on the actuator arm 18. If conventional seed tracks are prewritten on the platters 14, the head 20 seeks an init seed track. Otherwise, the SSW module 52 commands the head 20 to go to an approximate area of the platters 14 and search for spirals. This is accomplished by biasing the actuator arm 18 by applying a small constant current such that the actuator arm 18 gravitates to an approximate area of the platters 14, usually the ID.

As the platters 14 spin, the head 20 encounters spirals. A preamplifier 22 amplifies a spiral signal read by the head 20. A R/W channel 24 filters and forwards the spiral signal to the ADC module 62. The ADC module 62 converts the spiral signal from analog to digital format. The signal peak detection module 54 detects the peak of the spiral signal. The spiral signal comprises sync marks generated by the reference servo sectors (RSS). The RSS are prewritten on the platters 14 using an RSS clock. The phase error detection module 60 minimizes phase error between the sync marks and generates a phase correcting signal.

The PLL module 58 uses the phase correcting signal to synchronize a self-servo write (SSW) clock to the RSS clock derived from the spiral signals. The SSW module 52 uses the SSW clock to write servo. Additionally, the PLL module 58 generates a control signal for the timing window generator 56. The timing window generator 56 uses the control signal to position a signal detection window at different areas of the digitized spiral signal until the spiral peak is detected.

Figure 4:
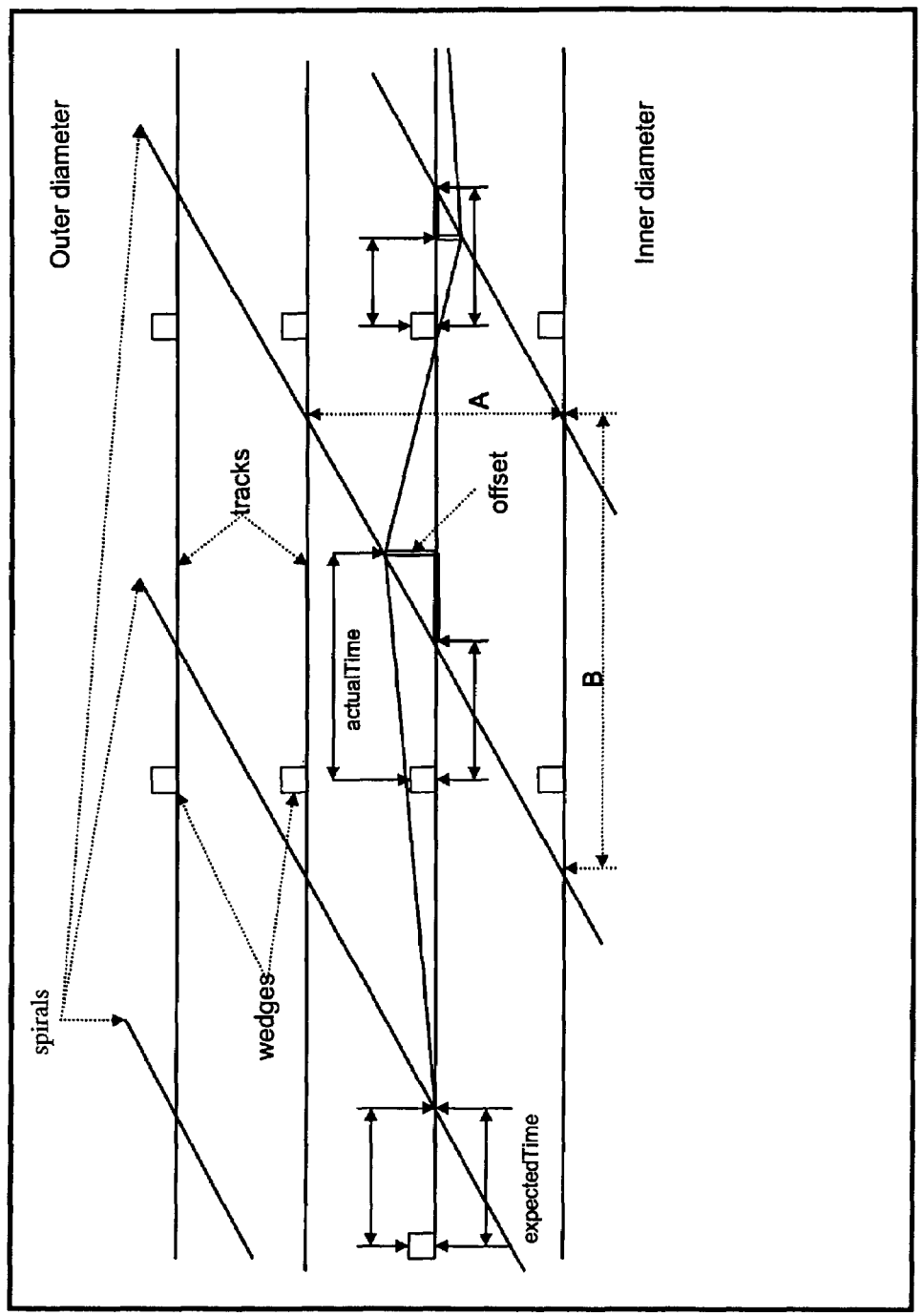
FIG. 4 illustrates calculation of spiral position offsets according to the present invention.

Referring now to FIG. 4, a method for determining a position of a spiral is shown. Although the spirals may not be written perfectly, spirals are shown as straight lines for illustrative purpose. The wedges shown are the prewritten servo address marks in the seed tracks that are detected by the head 20. Ideally, when the head 20 is locked on a track, the head can expect a spiral within a predetermined time after detecting a wedge. But when the head 20 is seeking, the actual time of encountering a spiral may vary depending on whether the head 20 is seeking toward the outer diameter (OD) or the inner diameter (ID) of the platters 14. Specifically, the actual time to detect a spiral will tend to increase when seeking OD and tend to decrease when seeking ID.

The SSW module 52 calculates an offset in time to detect a spiral as follows:

Offset=(Expected Time−Actual Time)*$A/B$, where, A=spiral to spiral distance, and B=spiral to spiral time. The offset is greater than zero as the head seeks OD and less than zero as the head seeks ID. Thus, the position of a spiral can be inferred from the offset. That is, if the offset is greater than zero, seek is toward OD, and if the offset is less than zero, then seek is toward ID.

Figure 5:
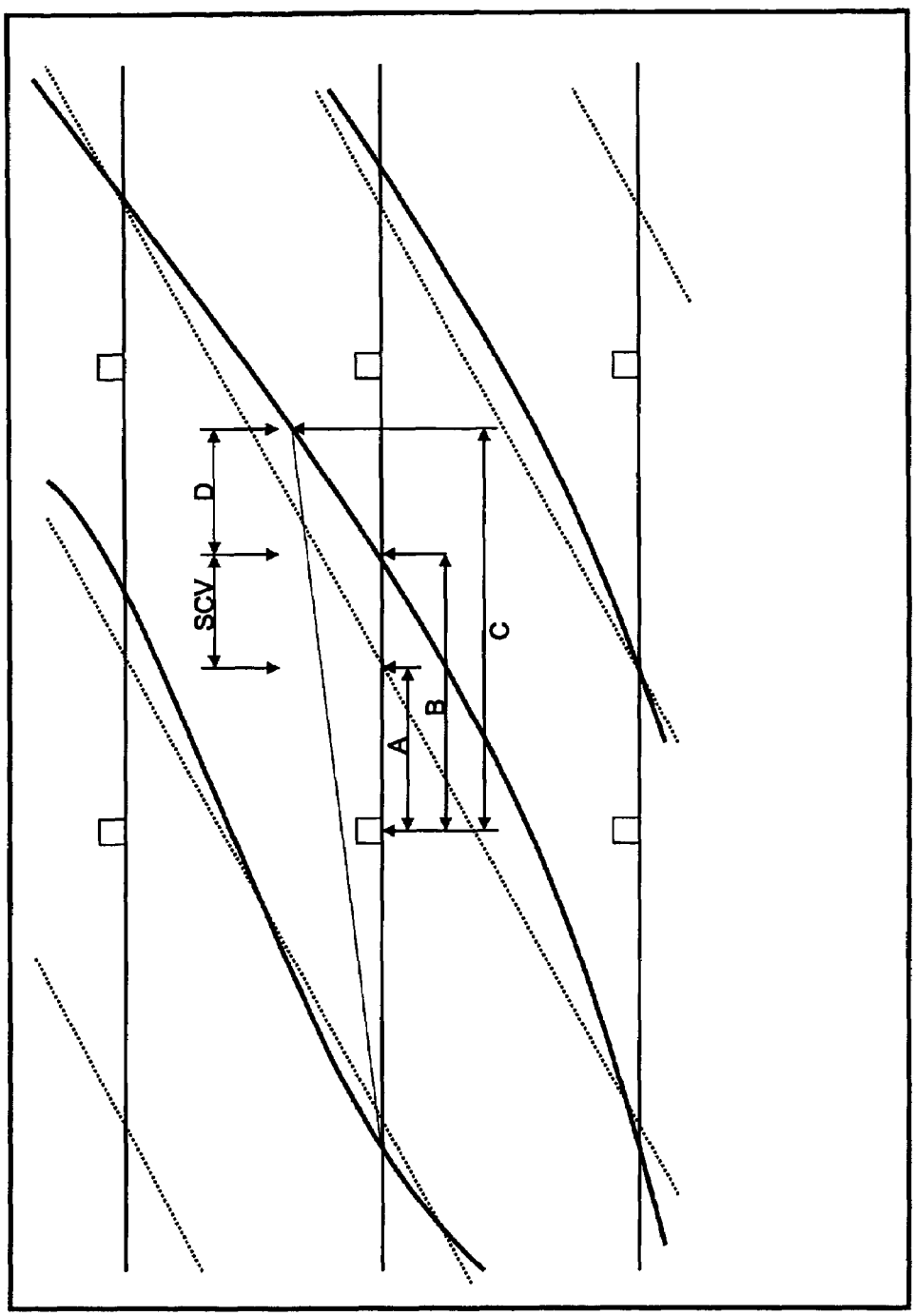
FIG. 5 illustrates calculation of spiral correction values according to the present invention.

Referring now to FIG. 5, a method for calculating spiral correction values is shown. Because the spirals may not be written perfectly, the spiral-to-spiral distance may not be constant. Moreover, the head 20 may move due to movement of the actuator arm 18. Furthermore, the spindle speed may vary due to fluctuations in the speed of the spindle motor 16. Consequently, the head 20 may not encounter consecutive spirals at definite time intervals. That is, the spiral-to-spiral time may vary.

The SSW module 52, however, requires accurate location of the spirals to correctly write servo between the spirals. Therefore, the SSW module 52 acquires the position information for each spiral by calculating spiral correction values, or offsets, for each spiral. The offsets compensate errors due to spiral imperfections, actuator arm movement, and spindle speed variation. Typically, offsets are calculated for each spiral for N spindle revolutions, where N is generally 10. An average of N offsets is taken to arrive at the SCV for each spiral.

The SSW module 52 calculates an SCV for each spiral using the following formula:

$$SCV = \left[\sum_{1}^{N} (C-D)/N\right] - A,$$

where A=expected time of spiral without actuator movement and spiral imperfections, C=observed spiral-to-spiral time with actuator movement and spiral imperfection, D=time due to actuator movement, and N is the number of spindle revolutions. The SSW module 52 uses the SCV's to accurately track and seek spirals and writes servo between spirals.

Figure 6:
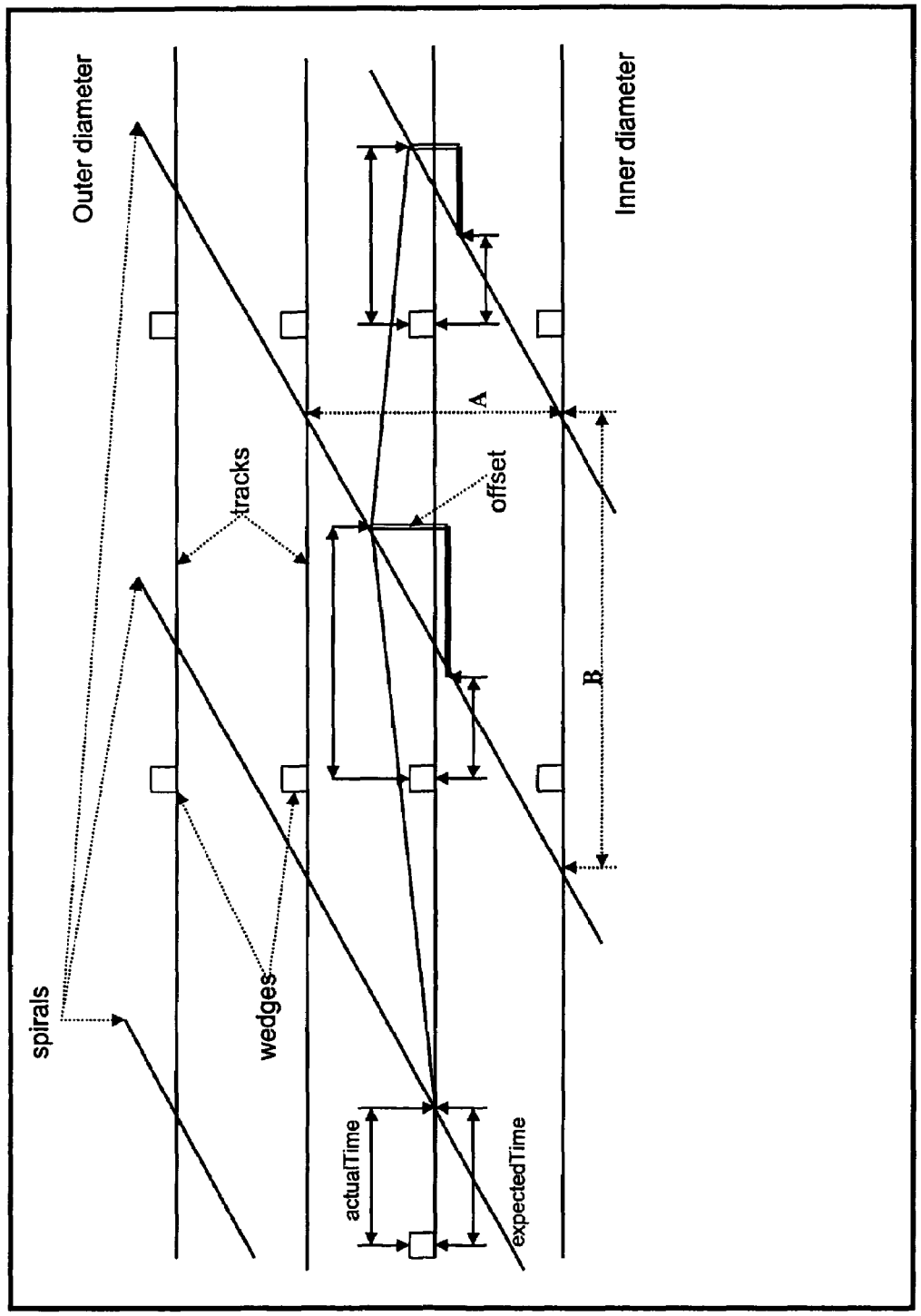
FIG. 6 illustrates seeking a spiral according to the present invention.

Referring now to FIG. 6, a method for seeking a spiral using the SCV's is shown. The SSW module 52 seeks a spiral by changing or dragging the expected time by a small amount of time equal to a seek-step time for the spiral. The SSW module 52 translates the resulting time information into distance when seeking the spiral. For example, reducing the expected time causes a seek toward ID, and increasing the expected time causes a seek toward OD. Similarly, when tracking spirals, the SSW module 52 infers from the time information whether the head 20 is moving toward OD or ID.

Figure 7:
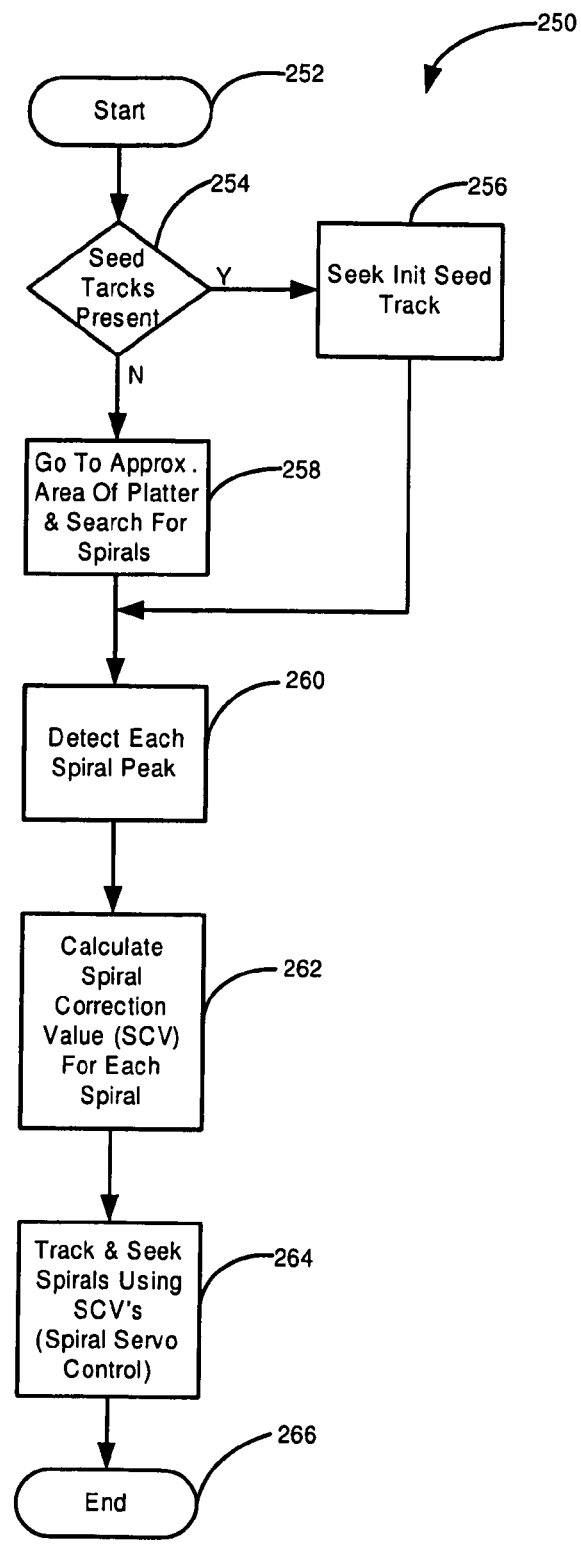
FIG. 7 is a flowchart of an exemplary method for servo control in disk drives according to the present invention.

Referring now to FIG. 7, a method 250 for disk drive servo control using spirals is shown. The method 250 begins at step 252. In step 254, an SSW module 52 checks if the platters 14 have prewritten seed tracks. If the platters 14 have prewritten seed tracks in step 254, the SSW module 52 commands a head 20 to seek an init seed track in step 256. If, however, seed tracks are not prewritten on the platters 14, then in step 258, the SSW module 52 commands the head 20 to go to an approximate area of a platters 14 and search for spirals.

In step 260, a signal peak detection module 54 detects the peak of each spiral signal using a signal detection window generated by a timing window generator 56. In step 262, the SSW module 52 performs spiral calibration. The SSW module 52 calculates spiral correction values (SCV's) for each spiral. The SCV's are offsets for each spiral that represent the difference between the expected and the observed, or actual, spiral-to-spiral times. These offsets compensate errors due to spiral imperfections, actuator arm movements, and spindle speed variations.

In step 264, the SSW module 52 uses the SCV's to accurately track and seek spirals and writes servo between the spirals. The SSW module 52 translates the time information from the SCV's into distance when seeking a spiral. Conversely, when tracking the spirals, the SSW module 52 infers from the time information whether the head 20 is moving toward outer diameter (OD) or inner diameter (ID) of the platters 14. The method 250 ends in step 266.

The spiral calibration may be implemented entirely by firmware. Additionally, the SSW module 52, the signal peak detection module 54, the timing window generator 56, the PLL module 58, and the phase error detection module 60 may be implemented by a single module.

Figure 8:
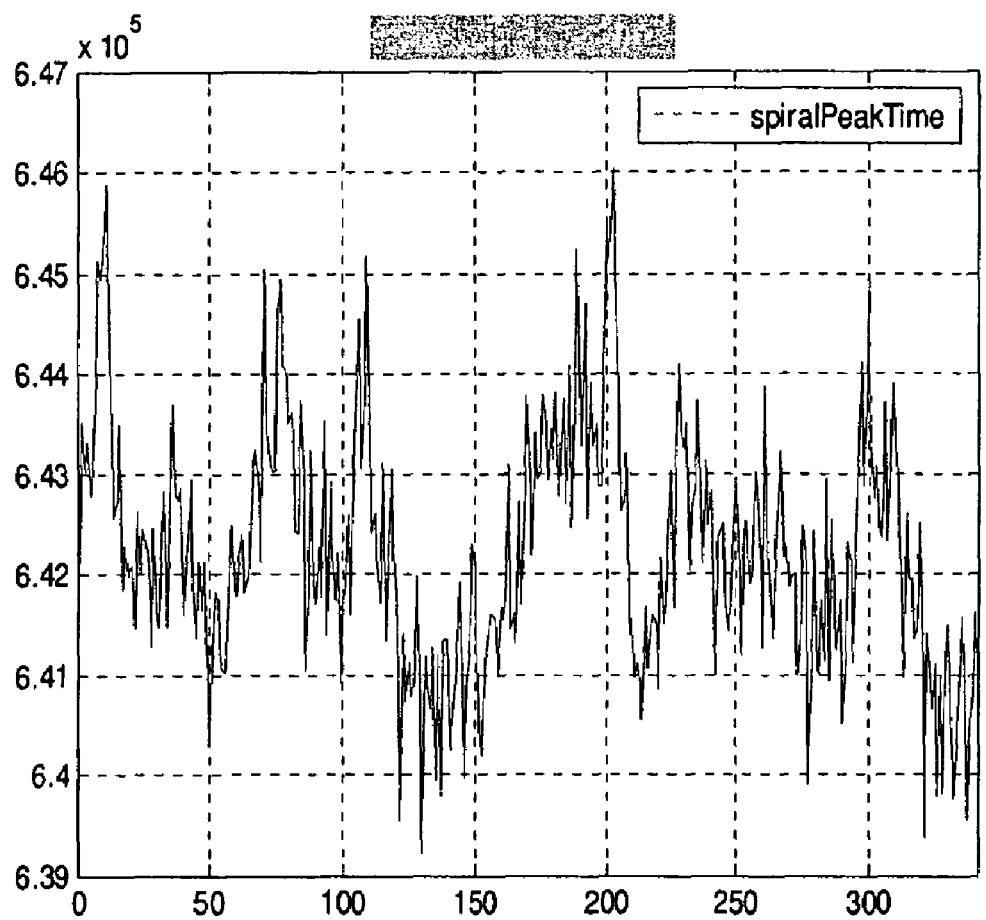
FIG. 8 is a graph of clock counts as a function of samples and illustrates raw spiral peak times obtained according to the present invention.
Figure 9:
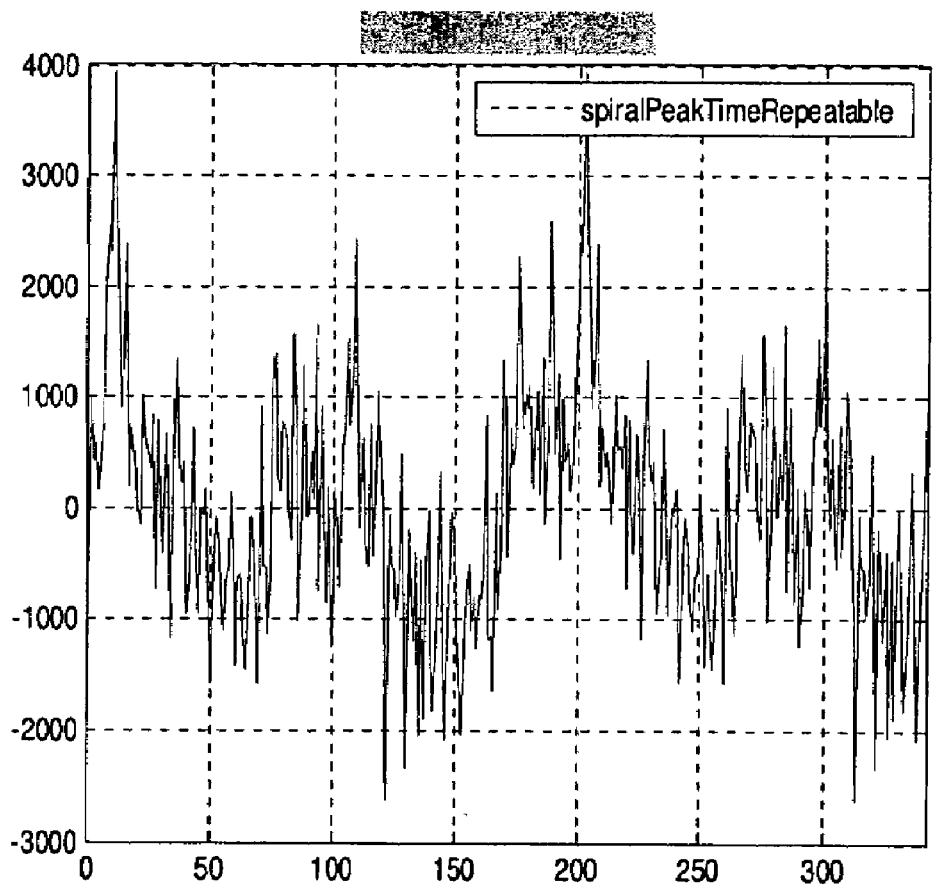
FIG. 9 is a graph of clock counts as a function of samples and illustrates spiral correction values measured according to the present invention.
Figure 10:
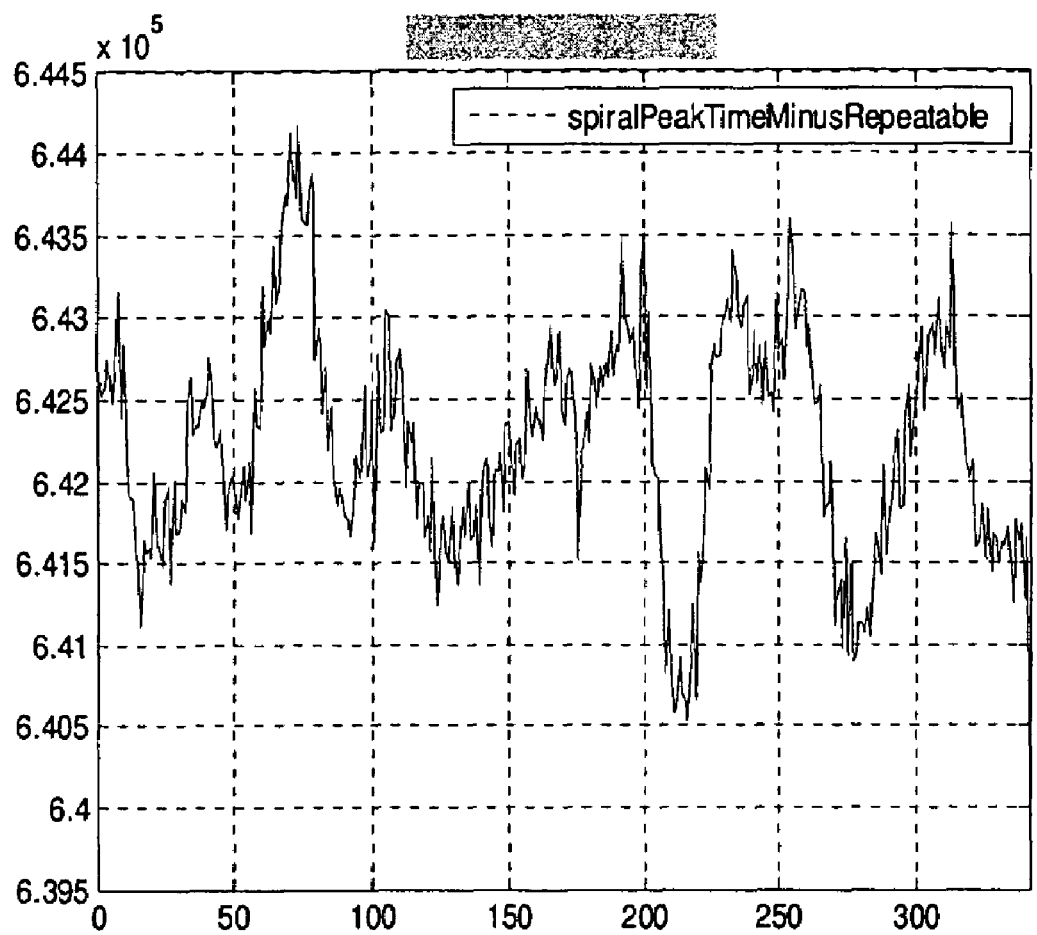
FIG. 10 is a graph of clock counts as a function of samples and illustrates spiral peak times obtained using the spiral correction values according to the present invention.

FIGS. 8-10 illustrate the significance of using the SCV's in tracking and seeking spirals. FIG. 8 shows the raw spiral peak times. FIG. 9 shows the SCV's. FIG. 10 shows the spiral peak times obtained using the SCV's. Notably, the spiral peak times obtained using the SCV's are without the repeatable errors due to spiral imperfections etc. and are therefore more accurate than when the SCV's are not used.

Figure 11:
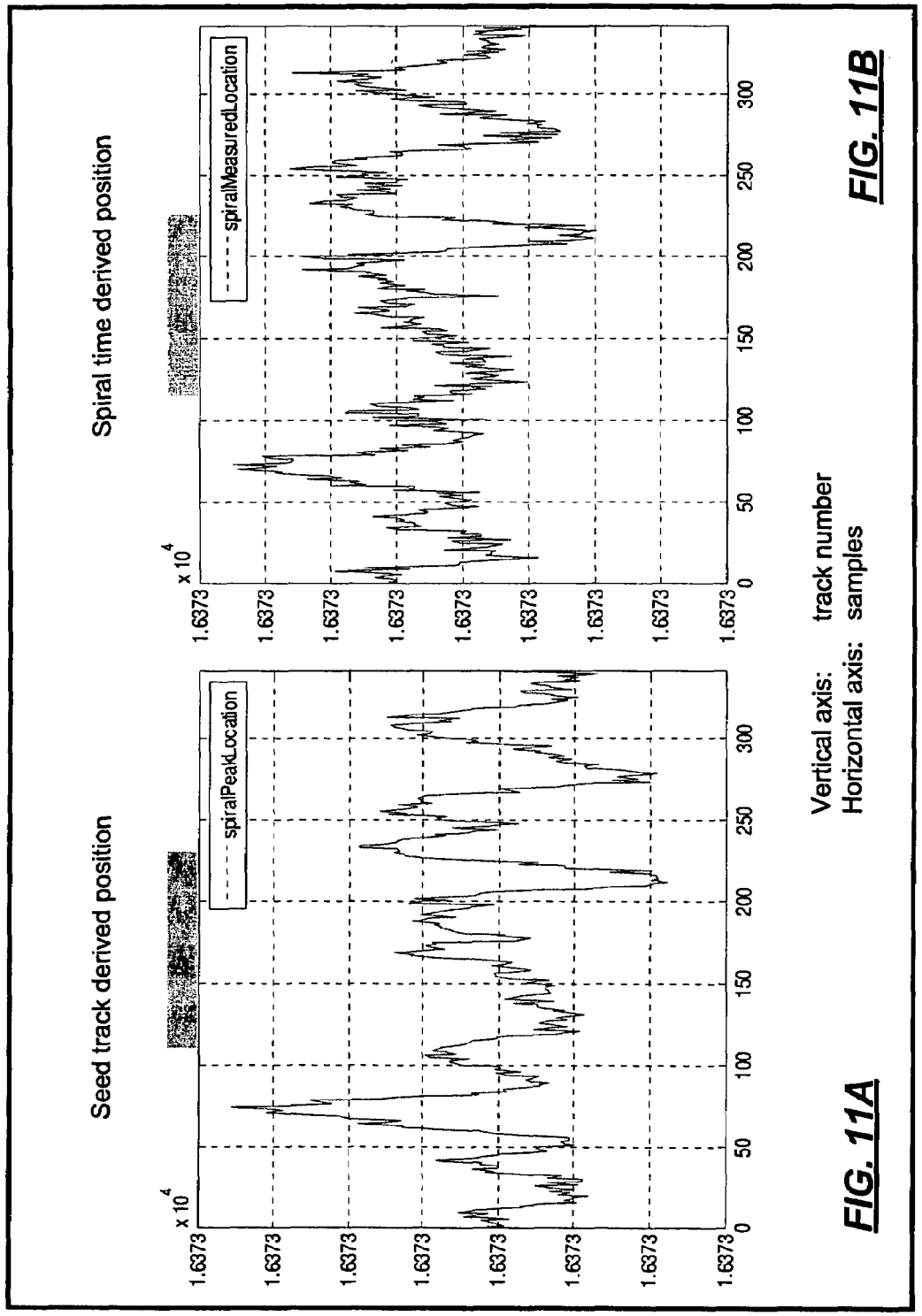
FIG. 11A is a graph of track numbers as a function of samples and illustrates position information derived from seed tracks according to the present invention.
FIG. 11B is a graph of track numbers as a function of samples and illustrates position information derived from spiral time according to the present invention.
Figure 12:
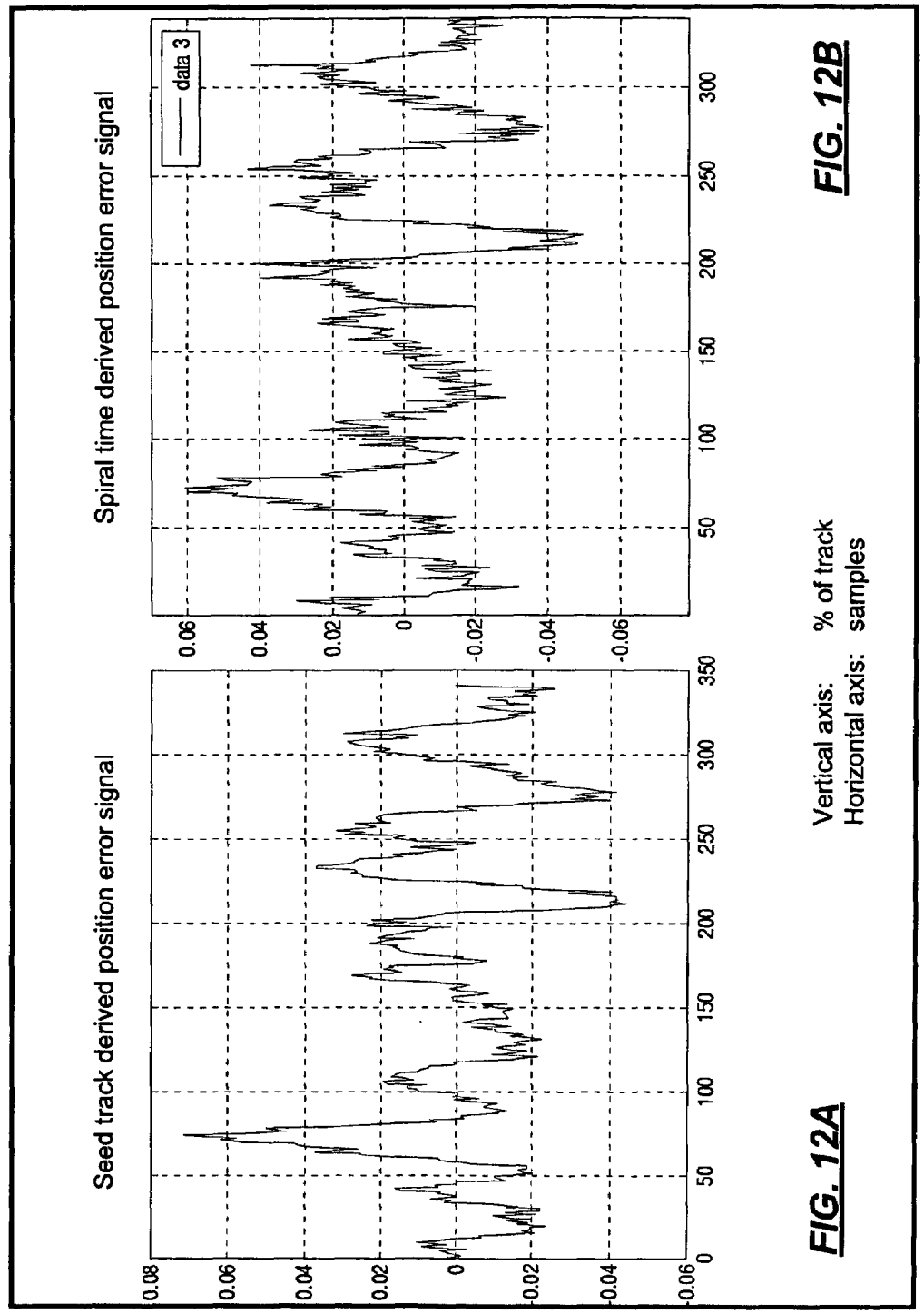
FIG. 12A is a graph of percentage of tracks as a function of samples and illustrates a measure of position error derived from seed tracks according to the present invention.
FIG. 12B is a graph of percentage of tracks as a function of samples and illustrates a measure of position error derived from spiral time according to the present invention.

The graphs in FIGS. 11A and 11B show that the spiral position information derived by using spirals according to the present invention is nearly as accurate as that derived by using the traditional seed tracks. Furthermore, the graphs in FIGS. 12A and 12B show that the position error signal derived by using spirals according to the present invention is nearly as accurate as that derived by using the traditional seed tracks.

Figure 13:
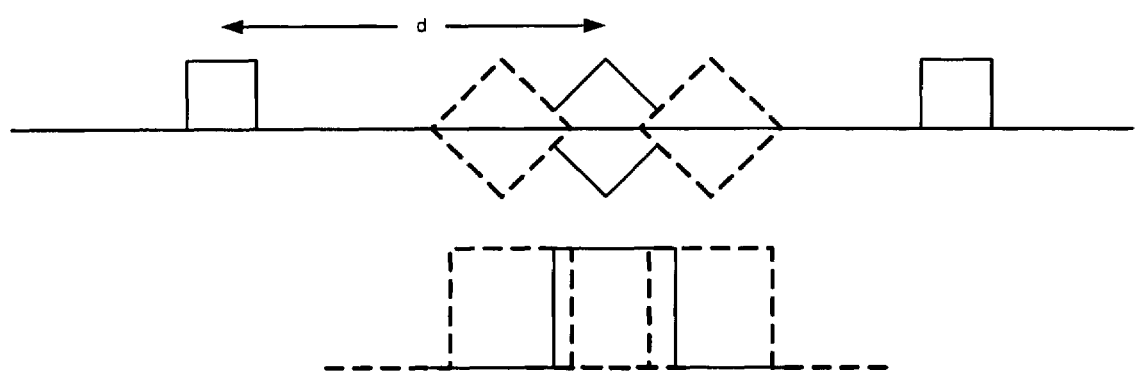
FIG. 13 illustrates waveforms of a spiral signal and a signal detection window according to the present invention.

Referring now to FIG. 13, a technique for detecting peak of a spiral signal is shown. Generally, a spiral signal includes multiple amplitude modulated waveforms that collectively appear in the form of a diamond shape. Accurate spiral calibration requires detecting the peak of each spiral signal because the SSW module 52 uses the peak time of each spiral signal to calculate SCV's. A timing window generator 56 generates a signal detection window to detect the peak of each spiral signal. The signal detection window is essentially a timing signal such as a square wave pulse. The signal detection window scans the digitized spiral signal until the signal peak detection module 54 detects the peak of each spiral signal.

Because inter-spiral distance may vary, a wide window may be necessary to cover all the spiral signals. But substantial processing power may be required to process signals in a wide window. Therefore, the timing window generator 56 determines an optimum size for the signal detection window that is sufficient to cover every spiral signal. A PLL module 58 generates a control signal that positions the signal detection window at different areas of the spiral signal until the signal peak is detected.

Figure 14:
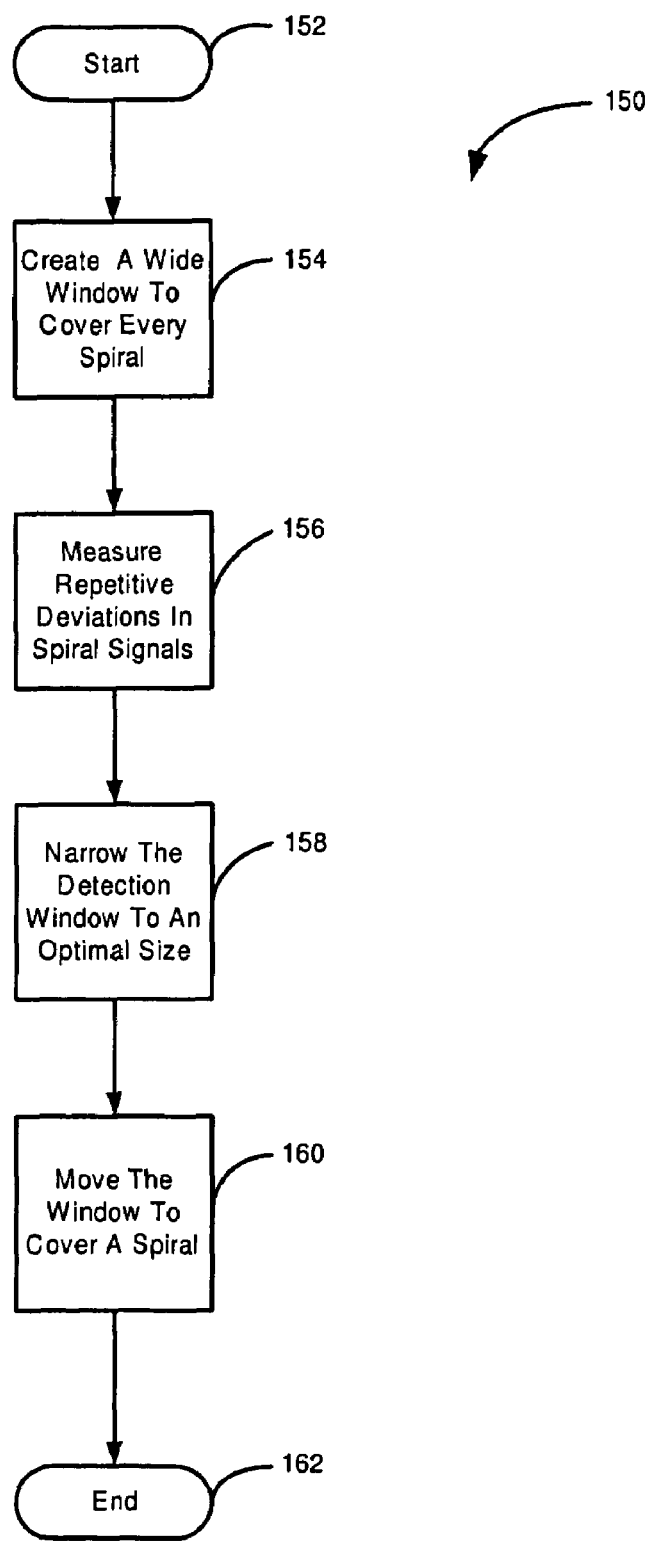
FIG. 14 is a flowchart of an exemplary method for dynamically adjusting a signal detection window to detect peaks of spirals according to the present invention.

Referring now to FIGS. 13 and 14, a method 150 for dynamically adjusting a signal detection window to detect peaks of spiral signals is shown. The method 150 begins at step 152. In step 154, a timing window generator 56 generates a wide signal detection window. In step 156, the timing window generator 56 measures deviations in multiple spiral signals. In step 158, the timing window generator 56 narrows the signal detection window to an optimal size that will cover every spiral signal.

In step 160, the timing window generator 56 uses a control signal generated by a phase-locked loop (PLL) module 58 to position the signal detection window at different areas of the spiral signal. The timing window generator 56 continues to dynamically adjust the signal detection window over different areas of the spiral signal until the signal peak detection module 54 finds the peak of the spiral signal. The method 150 ends in step 162.

Figure 15:
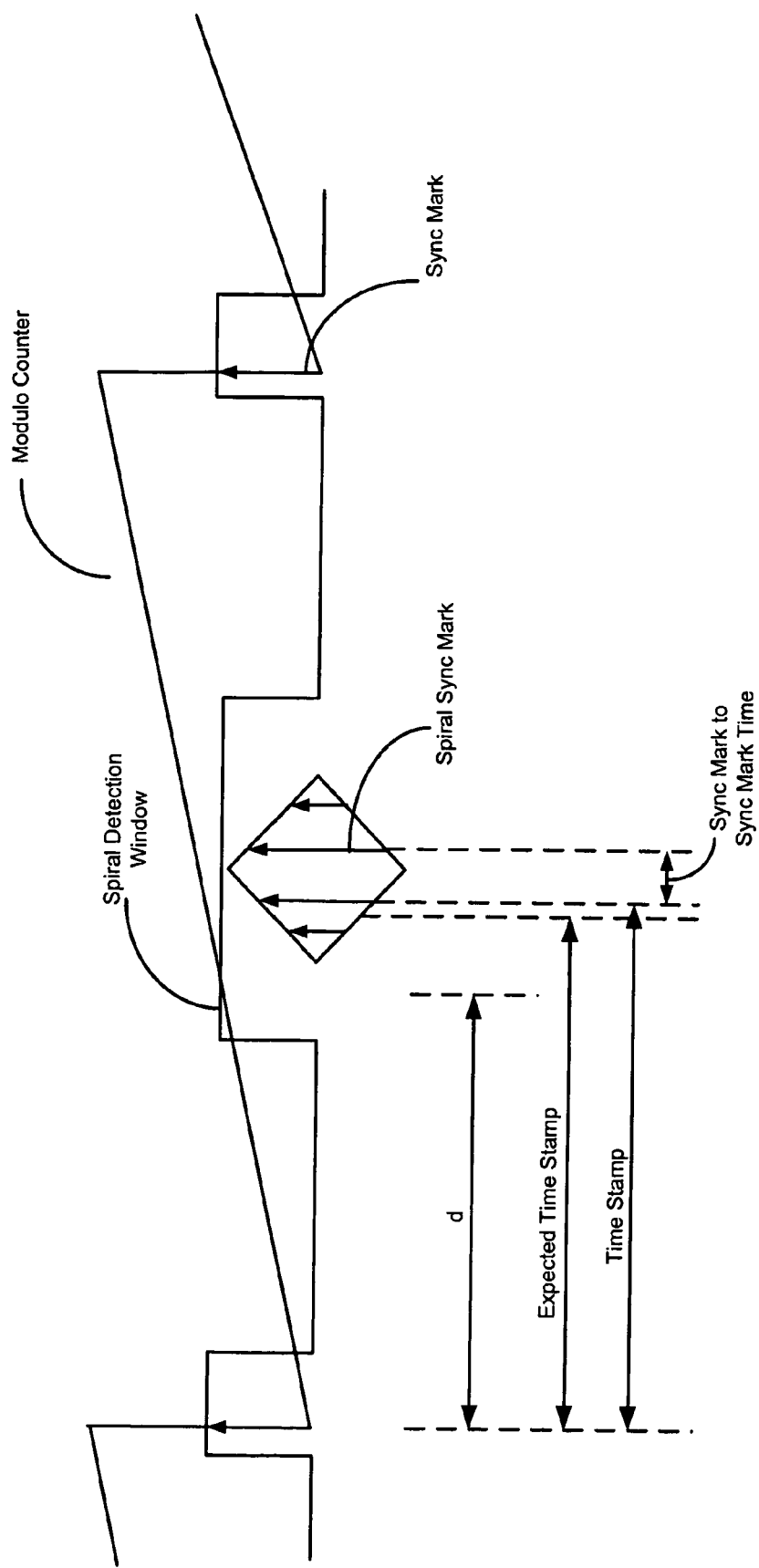
FIG. 15 illustrates an exemplary use of a modulo counter in measuring time stamps etc. according to the present invention.
Figure 16:
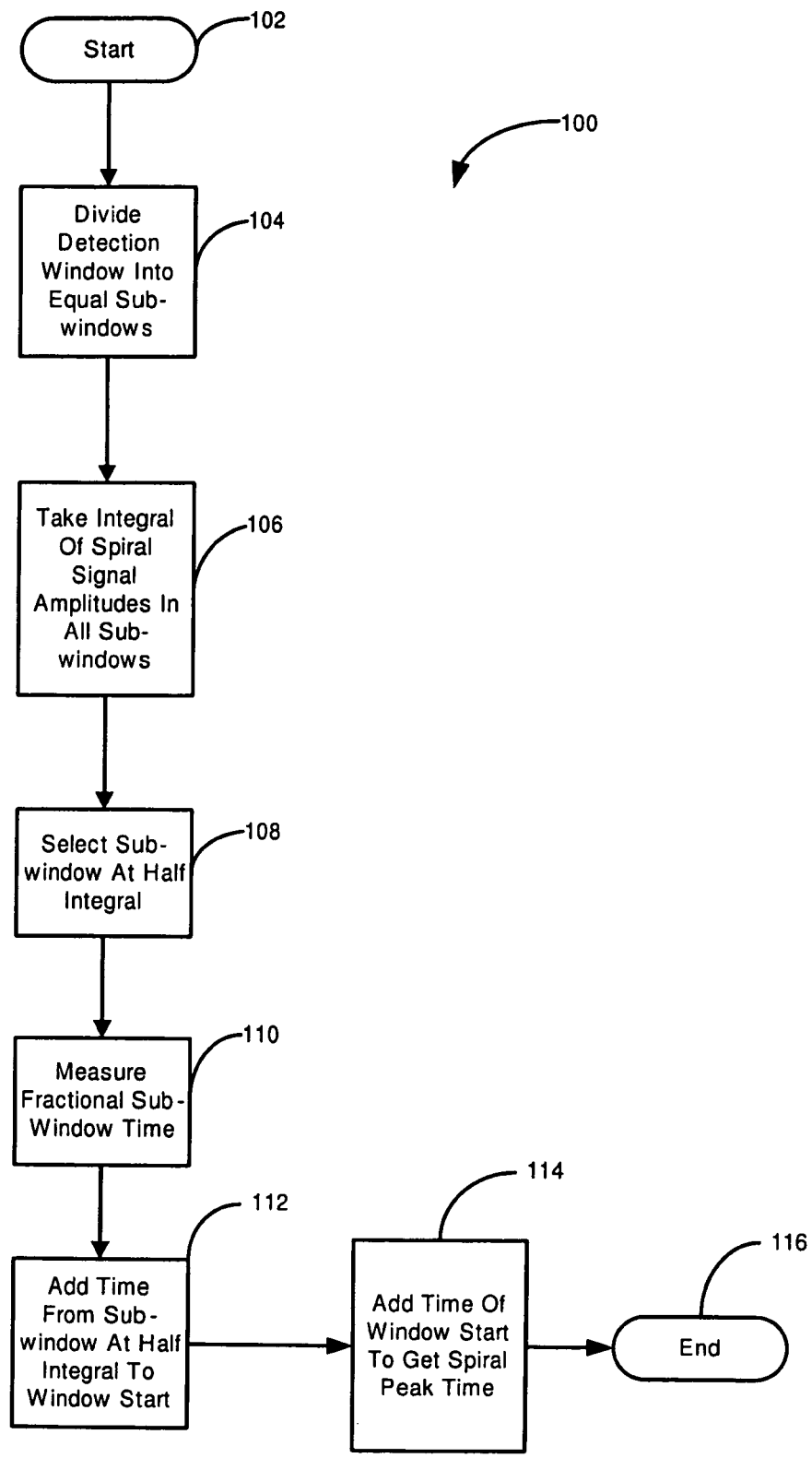
FIG. 16 is a flowchart of an exemplary method for calculating spiral peak times according to the present invention.
Figure 17:
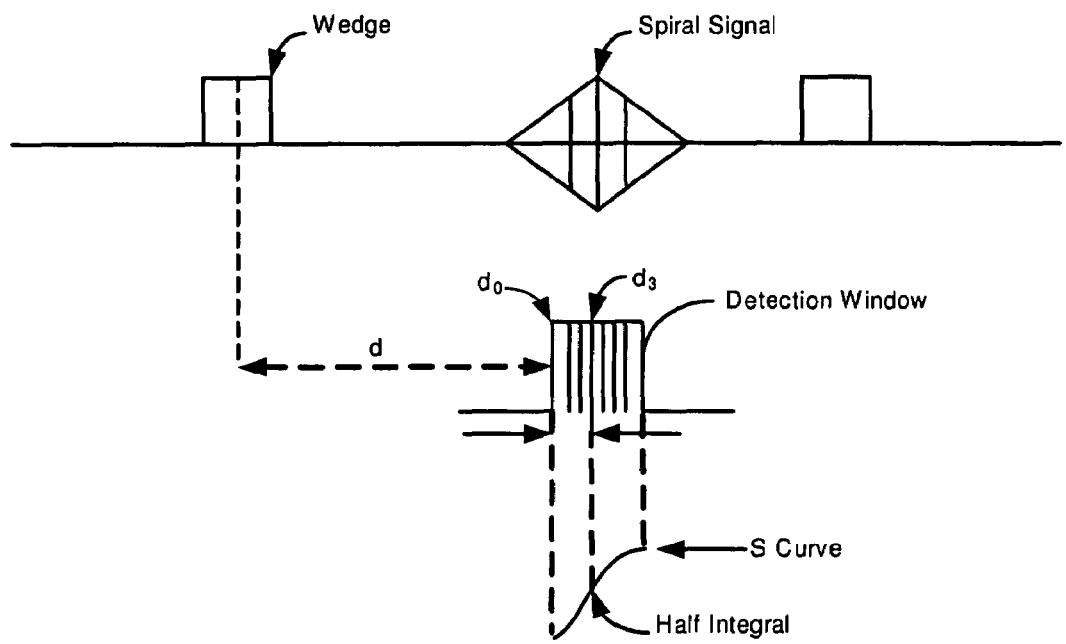
FIG. 17 illustrates steps in an exemplary method for calculating spiral peak times according to the present invention.

Referring now to FIGS. 15-17, a method 100 for calculating a spiral peak time is shown. A time stamp, window start time etc. are generally measured using a modulo counter clocked by the SSW clock as shown in FIG. 15. A time stamp is a snap shot of the modulo counter when a spiral sync mark is detected. The modulo counter is reset to 0 when account reaches a preset value that is normally equal to a wedge-to-wedge time of seed wedges. Initially, the modulo counter is synchronized to the sync marks in the seed wedges. That is, the modulo counter resets to 0 at the sync marks in the seed wedges as shown in FIG. 15. Effectively, the spiral peak time is a computed version of the modulo counter snap shot at the spiral peak.

The method 100 for calculating the spiral peak time begins at step 102 as shown in FIG. 16. A timing window generator 56 generates a signal detection window at time d from the center of a wedge to detect a spiral peak as shown in FIG. 17. In step 104, a signal peak detection module 54 divides the signal detection window into equal sub-windows of a predetermined size as shown in FIG. 17. Each sub-window defines the frame boundary of the multiple frames in the spiral signal. In step 106, the signal peak detection module 54 takes an integral of the amplitudes of the spiral signal in all the sub-windows. The integral is in the form of an S-curve as shown in FIG. 17.

In step 108, the signal peak detection module determines the half-integral point on the S-curve of the integral and detects the sub-window corresponding to the half-integral point as shown in FIG. 17. In step 110, the signal peak detection module 54 measures a fractional sub-window time if the half integral point falls between two frame boundaries, that is, within a sub-window (not shown in FIG. 17).

In step 112, the signal peak detection module 54 calculates the time from the frame boundary at the half-integral point to the beginning of the window (for example, $(d_3-d_0)$ in FIG. 17). This time is an integral multiple of the fixed sub-window time and is added to any fractional time calculated in step 110. In step 114, the signal peak detection module adds the time of window start (d in FIG. 17) to the result of step 112 to get the spiral peak time. The method 100 ends in step 116.

To write servo using the SCV's, the SSW module 52 requires that the SSW clock is synchronized to the RSS clock. The PLL module 58 synchronizes the SSW clock to the RSS clock. The RSS clock is derived from the spiral signals. The spiral signals, however, contain a repeatable error component due to spiral imperfections etc. As a result, the sync marks generated by the RSS within one spiral occur at slightly different time intervals than the sync marks in another spiral. Minimizing this phase error is essential to synchronize the SSW clock to the RSS clock.

Figure 18:
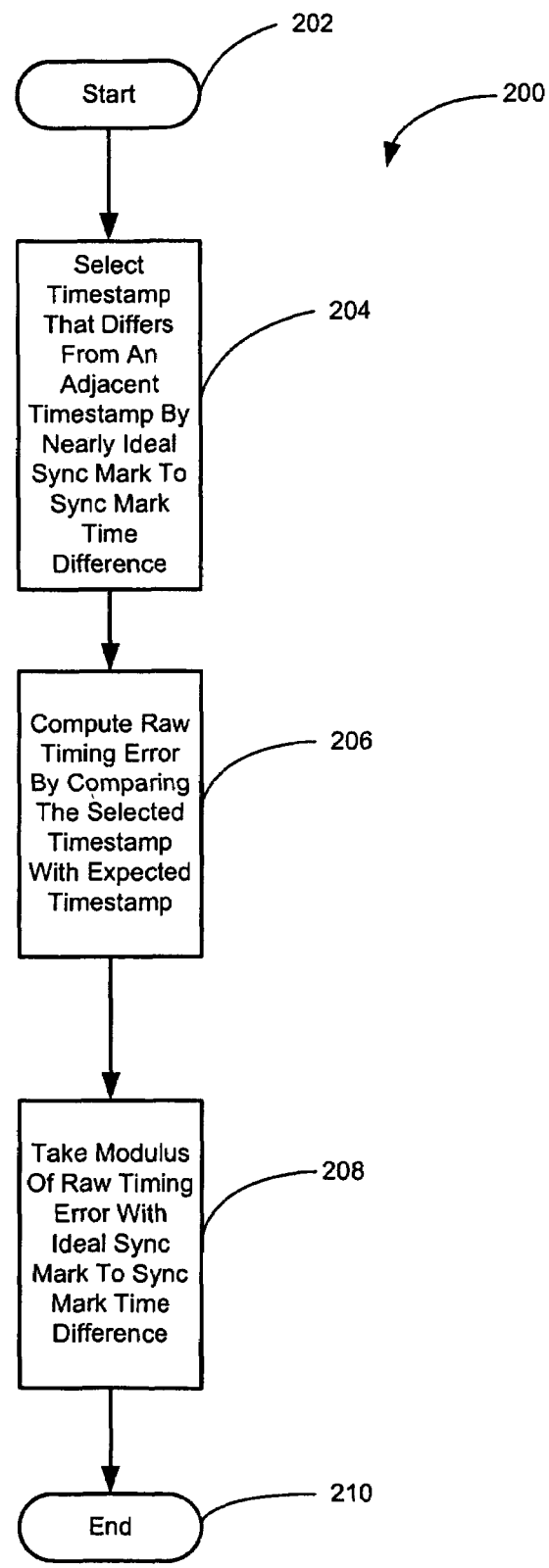
FIG. 18 is a flowchart for calculating a phase error between time stamps of measured and expected sync marks in a spiral signal according to the present invention.

Referring now to FIG. 18, a method 200 for calculating a phase error is shown. The method 200 begins at step 202. Typically, a spiral signal has multiple frames. Each frame has a sync mark and an associated time stamp that indicates a time when the hardware detects the sync mark. A difference between any two time stamps of consecutive frames or a sync mark to sync mark time difference is deterministic and specified by design. In step 204, a phase error detection module 60 selects a time stamp such that the time difference between the selected time stamp and a time stamp of an adjacent (previous or following) frame is within a range of an ideal sync mark to sync mark time difference determined by design.

In step 206, the phase error detection module 60 calculates a raw timing error by comparing the selected time stamp with an expected time stamp, where the expected time stamp value is initially set to the selected time stamp value. The error may occur because the time stamp values may vary from one spindle revolution to another due to variations in spindle speed.

In step 208, the phase error detection module 60 calculates a modulus of the raw timing error with the ideal sync mark to sync mark time difference to minimize the phase error. The modulus is taken because the selected time stamp may originate from any sync mark detected in the spiral and the timing error is expected to be a small fraction of the ideal sync mark to sync mark time. Importantly, the modulus is a measure of spindle jitter. The PLL module 58 uses the modulus, or minimized phase error, to synchronize the SSW clock to the RSS clock. The method 200 ends in step 210.

Figure 19B:
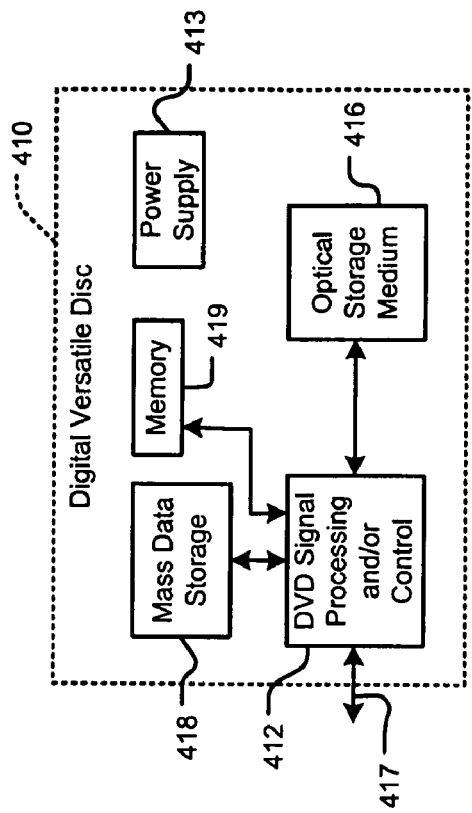
FIG. 19B is a functional block diagram of a digital versatile disk (DVD)
Figure 19A:
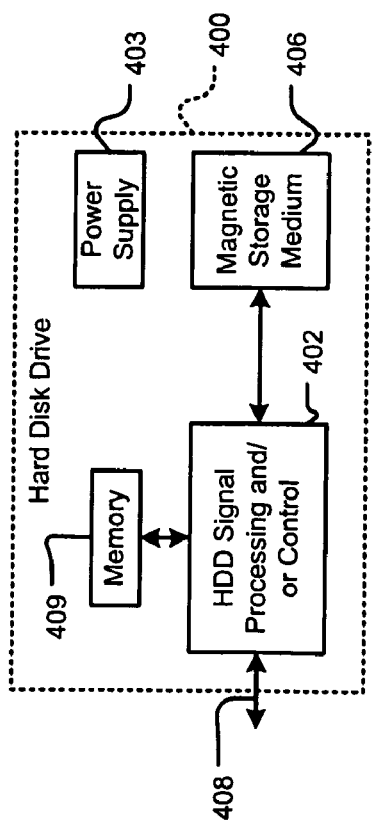
FIG. 19A is a functional block diagram of a hard disk drive.

Referring now to FIGS. 19A-19G, various exemplary implementations of the present invention are shown. Referring now to FIG. 19A, the present invention can be implemented in a hard disk drive 400. The present invention may be implemented in either or both signal processing and/or control circuits which are generally identified in FIG. 19A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 19B, the present invention can be implemented in a digital versatile disc (DVD) drive 410. The present invention may be implemented in either or both signal processing and/or control circuits, which are generally identified in FIG. 19B at 412, and mass data storage 418 of the DVD drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 19A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 19D:
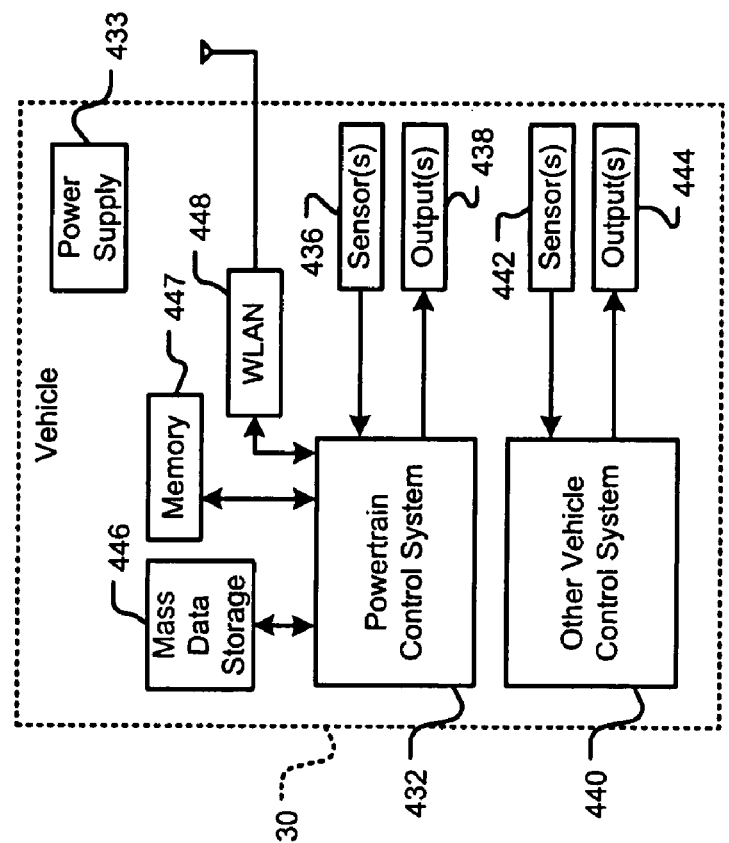
FIG. 19D is a functional block diagram of a vehicle control system.
Figure 19C:
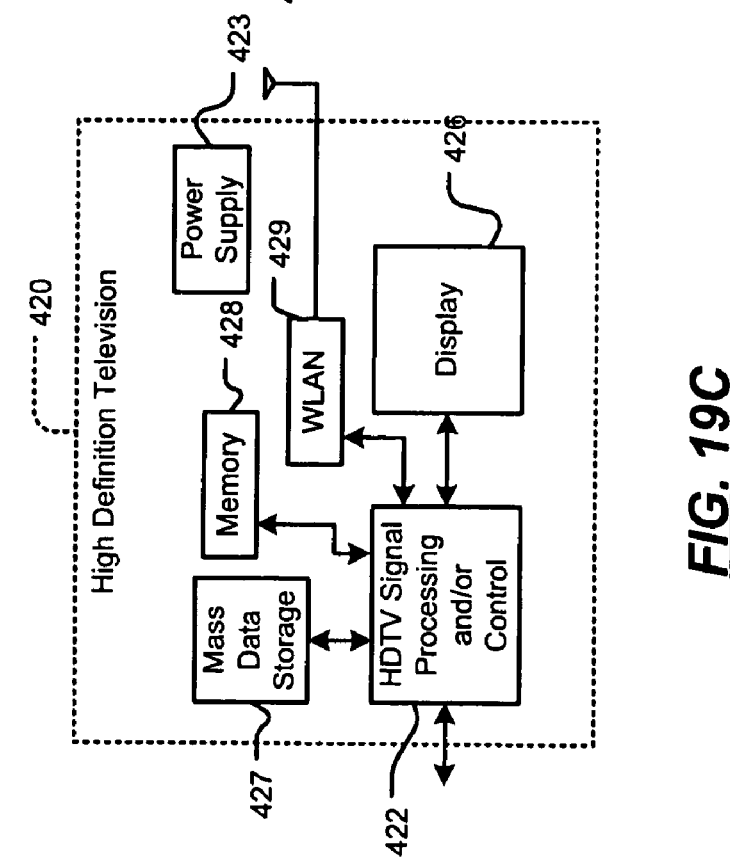
FIG. 19C is a functional block diagram of a high definition television.

Referring now to FIG. 19C, the present invention can be implemented in a high definition television (HDTV) 420. The present invention may be implemented in either or both signal processing and/or control circuits, which are generally identified in FIG. 19C at 422, and mass data storage 427 of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 19A and/or at least one DVD may have the configuration shown in FIG. 19B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 19D, the present invention may be implemented in mass data storage 446 of a vehicle control system 430. In some implementations, the present invention implements a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 19A and/or at least one DVD may have the configuration shown in FIG. 19B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 19E:
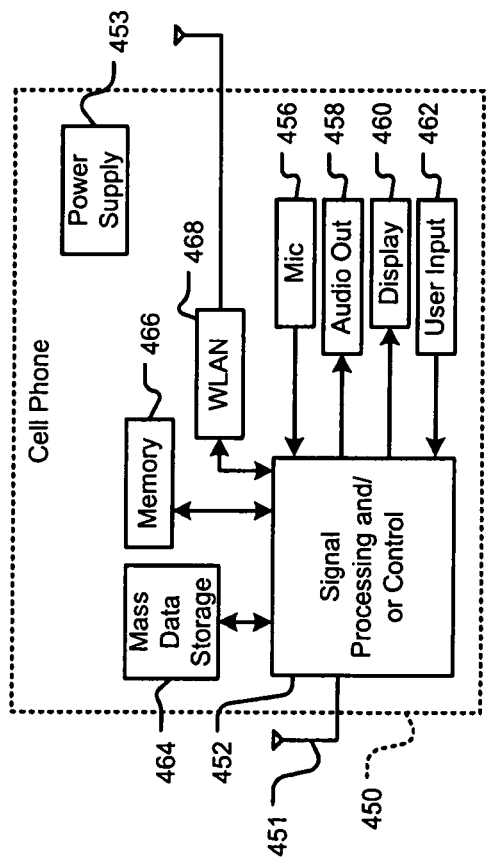
FIG. 19E is a functional block diagram of a cellular phone.

Referring now to FIG. 19E, the present invention can be implemented in a cellular phone 450 that may include a cellular antenna 451. The present invention may be implemented in either or both signal processing and/or control circuits, which are generally identified in FIG. 19E at 452, and mass data storage 464 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 19A and/or at least one DVD may have the configuration shown in FIG. 19B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 19F:
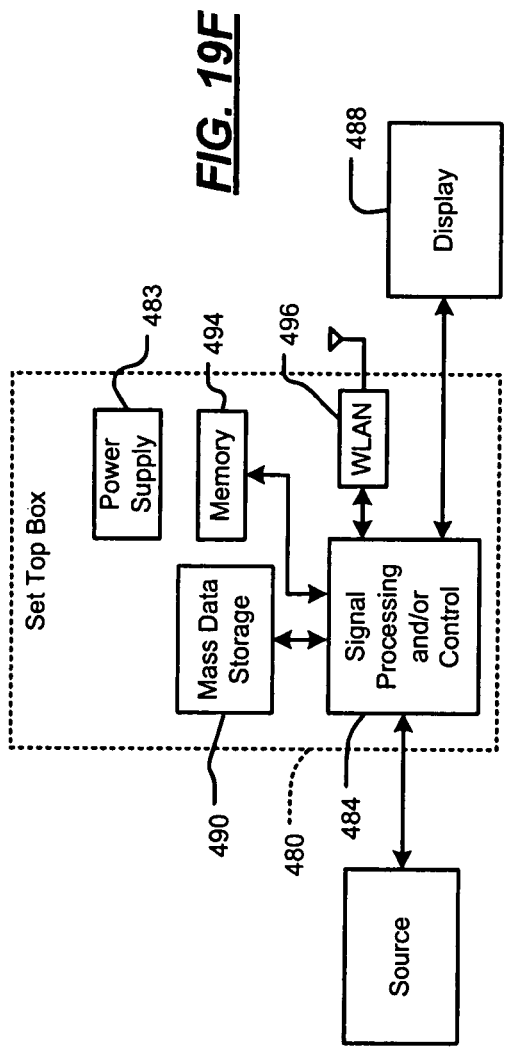
FIG. 19F is a functional block diagram of a set top box.

Referring now to FIG. 19F, the present invention can be implemented in a set top box 480. The present invention may be implemented in either or both signal processing and/or control circuits, which are generally identified in FIG. 19F at 482, and mass data storage 490 of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 19A and/or at least one DVD may have the configuration shown in FIG. 19B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 19G:
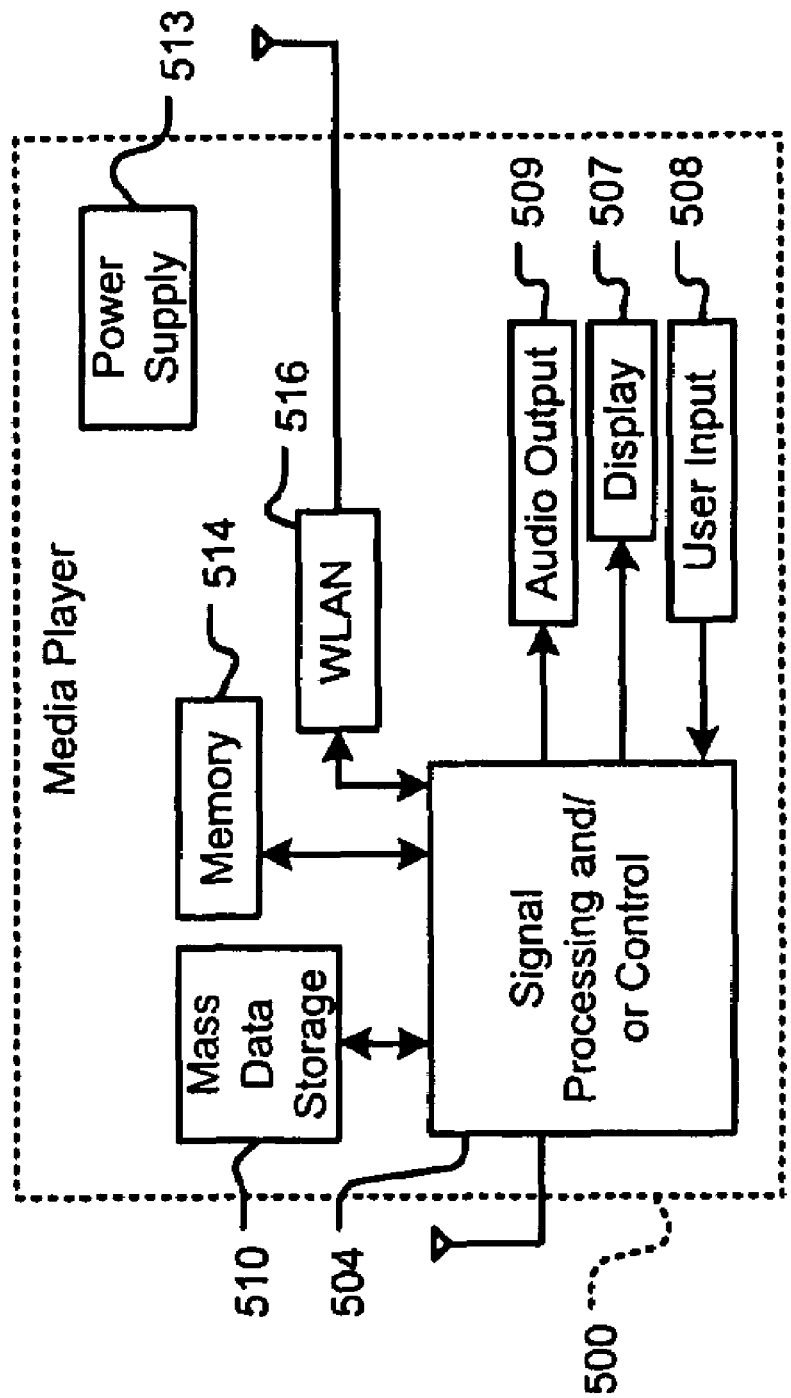
FIG. 19G is a functional block diagram of a media player.

Referring now to FIG. 19G, the present invention can be implemented in a media player 500. The present invention may be implemented in either or both signal processing and/or or control circuits, which are generally identified in FIG. 19G at 504, and mass data storage 510 of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 19A and/or at least one DVD may have the configuration shown in FIG. 19B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A servo control system, comprising:
   a peak detection module that detects peak times of spiral signals generated by reading spirals prewritten on a magnetic medium; and
   a control module that determines positions of said spirals based on said peak times, stores said positions of said spirals, seeks and tracks said spirals using said positions, and writes servo on said magnetic medium based on said positions of said spirals,
   wherein said control module radially seeks by changing an expected peak time for one of said spirals based on at least one of an offset and a spiral correction value and by translating a resultant peak time into a radial distance, and
   wherein said offset is indicative of radial seek direction.

2. The servo control system of claim 1 wherein said control module measures an actual time from one of a reference servo mark and a peak of one of said spiral signals to a peak of an adjacent spiral signal.

3. The servo control system of claim 1 wherein said control module calculates an expected time from one of a reference servo mark and a peak of one of said spiral signals to a peak an adjacent spiral signal.

4. The servo control system of claim 1 wherein said control module generates a difference between an actual time and an expected time from one of a reference servo mark and a peak of one of said spiral signals to a peak of an adjacent spiral signal.

5. The servo control system of claim 4 wherein said control module generates N of said differences, where N is an integer greater than 1, and uses an average of said N differences as a correction value to determine a position of said one of said spirals.

6. The servo control system of claim 1 wherein said control module radially seeks by changing said expected peak time by a seek-step time for one of said spirals.

7. The servo control system of claim 1 wherein said control module tracks said spirals by inferring radial distance from time based on said resulting time.

8. The servo control system of claim 1 further comprising a timing window generator that generates a timing window to scan said spiral signals.

9. The servo control system of claim 8 wherein said peak detection module determines a half-integral point of integral values and detects one of said sub-windows that corresponds to said half-integral point.

10. The servo control system of claim 1 wherein said peak detection module counts time of one of said spiral signals relative to a reference servo mark.

11. The servo control system of claim 10 further comprising a timing window generator that generates a timing window, wherein said peak detection module divides said timing window into multiple sub-windows and calculates integral values of amplitudes of one of said spiral signals in each of said sub-windows.

12. The servo control system of claim 11 wherein said peak detection module selects a half-integral point of said integral values and detects one of said sub-windows that corresponds to said half-integral point.

13. The servo control system of claim 12 wherein said peak detection module counts time from said one of said sub-windows to said reference servo mark to determine said peak time.

14. The servo control system of claim 1 further comprising a phase error detection module that detects a phase error signal.

15. The servo control system of claim 14 wherein said phase error detection module selects a first time stamp that differs from a second time stamp by a time that is substantially equal to a predetermined time.

16. The servo control system of claim 15 wherein said phase error detection module calculates a raw timing error by comparing said first time stamp with an expected time stamp.

17. The servo control system of claim 16 wherein said phase error detection module calculates a modulus of said raw timing error and generates a phase error signal.

18. The servo control system of claim 1 further comprising a phase-locked loop (PLL) module that uses a phase error signal generated by a phase error detection module to synchronize a self-servo write (SSW) clock to a reference servo sector (RSS) clock derived from said spiral signals.

19. The servo control system of claim 1 wherein said control module comprises at least one of said peak detection module, a timing window generator module, a phase-locked loop module, and a phase error detection module.

20. A hard disk subsystem comprising the servo control system of claim 1 and further comprising:
a hard disk controller that communicates with said servo control system;
a read-write channel that communicates with said hard disk controller; and
an interface that communicates with said hard disk controller.

21. A hard disk system comprising the hard disk subsystem of claim 20 and further comprising:
a magnetic medium; and
a read-write head that communicates with said hard disk subsystem and that reads and writes data on said magnetic medium.

22. A method for servo control, comprising:
detecting peak times of spiral signals generated by reading spirals prewritten on a magnetic medium;
determining positions of said spirals based on said peak times;
storing said positions of said spirals;
seeking and tracking said spirals using said positions;
writing servo on said magnetic medium based on said positions of said spirals; and
seeking radially by changing an expected peak time for one of said spirals based on at least one of an offset and a spiral correction value and by translating a resultant peak time into a radial distance,
wherein said offset is indicative of radial seek direction.

23. The method of claim 22 further comprising measuring an actual time from one of a reference servo mark and a peak of one of said spiral signals to a peak of an adjacent spiral signal.

24. The method of claim 22 further comprising calculating an expected time from one of a reference servo mark and a peak of one of said spiral signals to a peak an adjacent spiral signal.

25. The method of claim 22 further comprising generating a difference between an actual time and an expected time from one of a reference servo mark and a peak of one of said spiral signals to a peak of an adjacent spiral signal.

26. The method of claim 25 further comprising generating N of said differences, where N is an integer greater than 1, and using an average of said N differences as a correction value to determine a position of said one of said spirals.

27. The method of claim 22 further comprising seeking in radial position one of said spirals by changing said expected peak time by a seek-step time for said one of said spirals.

28. The method of claim 22 further comprising tracking said spirals by inferring radial distance from time based on said resulting time.

29. The method of claim 22 further comprising generating a timing window to scan said spiral signals.

30. The method of claim 22 further comprising generating a control signal to synchronize said spiral signals to a timing window generated by a timing window generator.

31. The method of claim 22 further comprising determining a peak time of one of said spiral signals relative to a reference servo mark.

32. The method of claim 31 further comprising generating a timing window, dividing said timing window into multiple sub-windows, and calculating integral values of amplitudes of one of said spiral signals in each of said sub-windows.

33. The method of claim 32 further comprising determining a half-integral point of said integral values and detecting one of said sub-windows that corresponds to said half-integral point.

34. The method of claim 33 further comprising counting time from said one of said sub-windows to said reference servo mark to determine said peak time.

35. The method of claim 22 further comprising detecting a phase error between time stamps of a plurality of reference servo marks and minimizing said phase error.

36. The method of claim 35 further comprising selecting a first time stamp that differs from a second time stamp by a time that is substantially equal to a predetermined time.

37. The method of claim 36 further comprising calculating a raw timing error by comparing said first time stamp with an expected time stamp.

38. The method of claim 37 further comprising calculating a modulus of said raw timing error and generating a phase error signal.

39. The method of claim 22 further comprising using a phase error signal to synchronize a self-servo write (SSW) clock to a reference servo sector (RSS) clock derived from said spiral signals.

40. The servo control system of claim 1 wherein said control module determines said offset based on an expected peak time, an actual peak timer a spiral to spiral radial distance, and a spiral to spiral circumferential distance.

41. The servo control system of claim 40 wherein said control module tracks said spirals by determining a radial distance based on said offset.

42. The servo control system of claim 40 wherein said control module minimizes said offset.

43. The servo control system of claim 1 wherein said control module determines said offset based on a difference in an expected peak time and an actual peak time and based on a spiral to spiral radial distance divided by a spiral to spiral circumferential distance.

44. The servo control system of claim 1 wherein said control module determines said spiral correction value based on at least one of an expected time of a spiral without actuator movement and spiral imperfections (A), an observed spiral-to-spiral time with actuator movement and spiral imperfections (C), and a time due to actuator movement (D).

45. The servo control system of claim 44 wherein said control module determines said spiral correction value based on a difference between C and D.

46. The servo control system of claim 44 wherein said control module determines said spiral correction value based on a sum of N differences between C and D, where N is a number of spindle revolutions.

47. The servo control system of claim 44 wherein said control module determines said spiral correction value based on a sum of N differences between C and D, where N is a number of spindle revolutions and based on a difference between the resulting sum and A.

48. The servo control system of claim 44 wherein said control module tracks said spirals by determining a radial distance based on said spiral correction value.

49. The servo control system of claim 1 wherein said control module tracks said spirals by inferring radial and circumferential distance based on a speed associated with writing a spiral.

50. The servo control system of claim 49 wherein said speed includes a spindle speed.

51. A servo control system, comprising:
a peak detection module that detects peak times of spiral signals generated by reading spirals prewritten on a magnetic medium; and
a control module that determines positions of said spirals based on said peak times, stores said positions of said spirals, seeks and tracks said spirals using said positions, and writes servo on said magnetic medium based on said positions of said spirals,
wherein said peak detection module determines a peak time of a spiral by integrating spiral signal amplitudes and selecting a half-integral point based on a result of said integration.

52. The servo control system of claim 51 wherein said peak detection module determines a first time between a reference time and a first start of a timing window, a second time between said first start and said half-integral point, and sums said first time and said second time to determine said peak time.

53. The servo control system of claim wherein said peak detection module in determining said second time determines a third time between said first start and a second start of a sub-window of said timing window and a fourth time between said second start and said half-integral point.

54. A servo control system, comprising:
a phase error detection module that generates a phase correcting signal;
a phase lock loop module that synchronizes a self-servo write clock to a reference servos sector clock based on said phase correcting signal; and
a control module that seeks and tracks spirals based on said self-servo write clock, and writes servo on said magnetic medium based on said based on said self-servo write clock,
wherein said phase error detection module selects a first time stamp that differs from a second time stamp by a time that is substantially equal to a predetermined time and generates a phase error signal based on said selection.

55. The servo control system of claim 54 wherein said phase error detection module calculates a raw timing error by comparing said first time stamp with an expected time stamp.

56. The servo control system of claim 55 wherein said phase error detection module calculates a modulus of said raw timing error and generates a phase error signal.

* * * * *

UNITED STATES PATENT AND TRADEMARK OFFICE
CERTIFICATE OF CORRECTION

PATENT NO.         : 7,411,758 B1  
APPLICATION NO.    : 11/337360  
DATED              : August 12, 2008  
INVENTOR(S)        : Man Cheung et al.

It is certified that error appears in the above-identified patent and that said Letters Patent is hereby corrected as shown below:

| | |
|---|---|
| Column 2, Line 53 | Insert -- of -- after "peak" |
| Column 3, Line 58 | Insert -- of -- after "peak" |
| Column 7, Line 25 | Delete "init" and insert -- initial -- |
| Column 16, Line 12 | Insert -- of -- after "peak" |
| Column 16, Line 66 | Delete "timer" and insert -- time -- |
| Column 18, Line 16 | Insert -- 52 -- after "claim" |

Signed and Sealed this

Twenty-fourth Day of February, 2009

JOHN DOLL  
*Acting Director of the United States Patent and Trademark Office*